United States Patent
Crogan et al.

(10) Patent No.: US 11,587,153 B2
(45) Date of Patent: *Feb. 21, 2023

(54) INTERACTIVE PAINT PRODUCT SELECTION AND ORDERING SYSTEMS, METHODS, AND NON-TRANSITORY COMPUTER READABLE MEDIUM

(71) Applicant: Behr Process Corporation, Santa Ana, CA (US)

(72) Inventors: James Crogan, Orange, CA (US); Kevin Vandever, Huntington Beach, CA (US); Damien Reynolds, Huntington Beach, CA (US); John Buzyn, Santa Ana, CA (US); Un Ho Chung, Santa Ana, CA (US); Woosang Jung, Cypress, CA (US); Jason van Marle, Los Angeles, CA (US); Puneet Piyush Thakar, Los Angeles, CA (US); Darwin Foye, Oak Park, CA (US); Marc Webb, Orange, CA (US)

(73) Assignee: Behr Process Corporation, Santa Ana, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/140,181

(22) Filed: Jan. 4, 2021

(65) Prior Publication Data

US 2021/0125267 A1 Apr. 29, 2021

Related U.S. Application Data

(63) Continuation of application No. 15/355,736, filed on Nov. 18, 2016, now Pat. No. 10,885,575.

(Continued)

(51) Int. Cl.
 G06Q 30/00 (2012.01)
 G06Q 30/0601 (2023.01)
 G06F 3/0482 (2013.01)

(52) U.S. Cl.
 CPC ....... *G06Q 30/0641* (2013.01); *G06F 3/0482* (2013.01); *G06Q 30/0635* (2013.01)

(58) Field of Classification Search
 CPC .................. G06Q 30/0641; G06Q 30/0635
 (Continued)

(56) References Cited

U.S. PATENT DOCUMENTS

| 4,665,394 A | 5/1987 | Coles et al. |
| 4,765,492 A | 8/1988 | Howard et al. |

(Continued)

FOREIGN PATENT DOCUMENTS

| CN | 202372257 U | 8/2012 |
| CN | 202471251 U | 10/2012 |

(Continued)

OTHER PUBLICATIONS

Berger, A. H. (1985). Benjamin moore uses computers to analyze colors. Business Journal of New Jersey Weekly, 2(35), 20. Retrieved from https://search.proquest.com/docview/198018066?accountid=14753 (Year: 1985).*

(Continued)

*Primary Examiner* — Marissa Thein
*Assistant Examiner* — Arielle E Weiner
(74) *Attorney, Agent, or Firm* — Harness, Dickey & Pierce, P.L.C.

(57) ABSTRACT

Systems and methods are provided and include a server configured to receive a copy of paint product catalog information associated with a coating manufacturer, store a paint product ordering application, receive a measured color of a flooring product from a dealer computer terminal located at (Continued)

a flooring store, determine paint colors that coordinate with the flooring product based on a measured color of the flooring product and the copy of the paint product catalog information, communicate the paint colors to the dealer computer terminal, run the paint product ordering application, receive an order for a paint product from the dealer computer terminal, and communicate the order for the paint product to a computer system located at a coating manufacturer facility, the computer system being configured to receive transmission of the order for the paint product from the server for order fulfillment at the coating manufacturer facility.

15 Claims, 22 Drawing Sheets

Related U.S. Application Data

(60) Provisional application No. 62/263,464, filed on Dec. 4, 2015.

(58) Field of Classification Search
USPC ................................................ 705/26.81
See application file for complete search history.

(56) References Cited

U.S. PATENT DOCUMENTS

| | | | |
|---|---|---|---|
| 4,813,000 | A | 3/1989 | Wyman et al. |
| 5,803,739 | A | 9/1998 | Hitchcock |
| 5,855,480 | A | 1/1999 | Housman |
| 6,122,391 | A | 9/2000 | Ringland et al. |
| 6,270,123 | B1 | 8/2001 | Spangler |
| 6,416,612 | B1 | 7/2002 | Lerner et al. |
| 6,928,454 | B2 * | 8/2005 | Menner .............. G06Q 30/02 |
| 6,994,553 | B2 | 2/2006 | DaRif et al. |
| 7,202,976 | B2 | 4/2007 | Stone et al. |
| 7,204,376 | B2 | 4/2007 | Richardson et al. |
| 7,330,585 | B2 | 2/2008 | Rice et al. |
| 7,571,122 | B2 | 8/2009 | Howes |
| 7,641,474 | B2 | 1/2010 | Rice |
| 7,661,958 | B2 | 2/2010 | Meyer et al. |
| 7,789,472 | B2 | 9/2010 | Richardson et al. |
| 7,999,825 | B2 | 8/2011 | Webb et al. |
| 8,063,912 | B2 | 11/2011 | Reynolds et al. |
| 8,352,332 | B2 | 1/2013 | Pesicek |
| D680,350 | S | 4/2013 | Peake-Atkins et al. |
| 8,517,256 | B2 | 8/2013 | Stone et al. |
| 8,517,267 | B2 | 8/2013 | Reynolds et al. |
| 9,483,963 | B2 | 11/2016 | Woelfel et al. |
| 9,563,342 | B2 | 2/2017 | Reynolds et al. |
| 10,068,500 | B2 | 9/2018 | Jordan et al. |
| D865,064 | S | 10/2019 | Yeo |
| 2001/0021917 | A1 | 9/2001 | Hatano |
| 2002/0099725 | A1 | 7/2002 | Gordon |
| 2003/0151611 | A1 | 8/2003 | Turpin et al. |
| 2003/0158788 | A1 | 8/2003 | Turpin et al. |
| 2004/0078299 | A1 | 4/2004 | Down-Logan et al. |
| 2005/0102349 | A1 | 5/2005 | Rice et al. |
| 2005/0140691 | A1 | 6/2005 | Rice |
| 2006/0001677 | A1 * | 1/2006 | Webb .................. G01J 3/526 |
| | | | 345/594 |
| 2006/0195369 | A1 | 8/2006 | Webb et al. |
| 2006/0232802 | A1 | 10/2006 | Gray et al. |
| 2007/0018906 | A1 | 1/2007 | Visnovsky et al. |
| 2007/0271156 | A1 * | 11/2007 | Sarusi .............. G06Q 30/0633 |
| | | | 705/14.27 |
| 2007/0298382 | A1 | 12/2007 | Schilling |
| 2008/0228599 | A1 | 9/2008 | Webb et al. |
| 2008/0299521 | A1 | 12/2008 | Taylor et al. |
| 2009/0043674 | A1 | 2/2009 | Minsky et al. |
| 2010/0262551 | A1 | 10/2010 | Caruso et al. |
| 2011/0018895 | A1 | 1/2011 | Buzyn et al. |
| 2011/0266337 | A1 * | 11/2011 | Reynolds .............. G06F 3/041 |
| | | | 235/375 |
| 2013/0268871 | A1 | 10/2013 | Webb et al. |
| 2014/0025534 | A1 | 1/2014 | Pesicek |
| 2014/0046787 | A1 | 2/2014 | Norman et al. |
| 2014/0289069 | A1 | 9/2014 | Bhardwaj et al. |
| 2015/0079547 | A1 | 3/2015 | Moss |
| 2015/0140520 | A1 | 5/2015 | Jordan et al. |
| 2015/0153724 | A1 | 6/2015 | Platt |
| 2015/0356661 | A1 * | 12/2015 | Rousay .............. G06V 40/168 |
| | | | 705/26.7 |
| 2017/0374234 | A1 * | 12/2017 | Leskanic .............. H04N 1/6041 |

FOREIGN PATENT DOCUMENTS

| | | |
|---|---|---|
| KR | 20040028011 A | 4/2004 |
| KR | 10-2008-0100501 A | 11/2008 |

OTHER PUBLICATIONS

Payne, S. (2002). X-rite upgrade makes painting no easier. Grand Rapids Business Journal, 20(12) Retrieved from https://search.proquest.com/docview/216742794?accountid=14753 (Year: 2002).*
Office Action regarding Canadian Patent Application No. 2,950,034, dated Jun. 30, 2021.
Second Office Action regarding Chinese Patent Application No. 201611103530.4, dated Dec. 11, 2020. Translation provided by Deacons.
Fourth Office Action regarding Mexican Patent Application No. MX/a/2016/015722, dated Sep. 29, 2021. Translation provided by Clarke Modet & Co.
First Examination Report regarding Indian Patent Application No. 201814032058, dated Sep. 29, 2021.
Preliminary Rejection regarding Korean Patent Application No. 10-2018-0008840, dated Dec. 16, 2021. Translation provided by S.Y. Cha Patent Office.
Second Office Action regarding Colombian Patent Application No. NC2018/0009784, dated Dec. 24, 2021. Translation provided by Clarke Modet.
Notice of Preliminary Rejection regarding Korean Patent Application No. 161783/2016, dated Mar. 17, 2017.
Notice of Decision of Final Rejection regarding Korean Patent Application No. 161783/2016, dated Sep. 27, 2017.
Office Action regarding Canadian Application No. 2,950,034, dated Oct. 4, 2018.
Office Action regarding Colombian Patent Application No. NC2016/0004864, dated May 6, 2019. Translation provided by Clarke Modet.
Office Action regarding Canadian Patent Application No. 2,950,034, dated Jul. 22, 2019.
First Office Action regarding Mexican Patent Application No. MX/a/2016/015722, dated Sep. 6, 2019. Translation provided by Clarke Modet & Co.
Office Action regarding Chilean Patent Application No. 201802791, dated Sep. 16, 2019. Translation provided by Clarke Modet & Co. Chile.
Second Office Action regarding Colombian Patent Application No. NC2016/0004864, dated Feb. 3, 2020. Translation provided by Clarke, Modet & Co.
Non-Final Office Action regarding U.S. Appl. No. 15/723,762, dated Feb. 27, 2020.
Non-Final Office Action regarding U.S. Appl. No. 15/355,736 dated Apr. 23, 2020.
Second Office Action and Search Report regarding Chilean Patent Application No. 201802791, dated Mar. 16, 2020. Translation provided by Clarke, Modet & Co.
First Office Action regarding Chinese Patent Application No. 201611103530.4, dated Apr. 3, 2020. Translation provided by Deacons. Waiting for Translation.
First Office Action regarding Chinese Patent Application No. 201611103530.4, dated Apr. 3, 2020. Translation provided by Deacons.

(56) References Cited

OTHER PUBLICATIONS

First Examination Report regarding Indian Application No. 20161404173, dated Jun. 12, 2020. Translation provided by Zeus IP.
Third Office Action regarding Colombian Application No. NC20160004864, dated Jun. 18, 2020. Translation provided by Clarke Modet & Co.
Office Action regarding Canadian Application No. 2,950,034, dated Jul. 23, 2020.
Preliminary Office Action regarding Brazilian Patent Application No. 1020160285402, dated Aug. 18, 2020. Translation provided by Clarke Modet & Co.
Berger, A. H. (1985). Benjamin moore uses computers to analyze colors. Business Journal of New Jersey Weekly, 2(35), 20. Retrieved from https://search.proquest.eom/docview/198018066?accountid=14753 (Year: 185).
Second Office Action regarding Mexican Patent Application No. MX/a/2016/015722, dated Aug. 3, 2020. Translation provided by Clarke Modet & Co.
Notice of Allowance and Fees Due regarding U.S. Appl. No. 15/355.736, dated Oct. 28, 2020.
Third Office Action regarding Colombian Patent Application No. NC2018/0009784, dated Mar. 31, 2022. Translation provided by Clarke Modet & Co.
First Office Action regarding Colombian Application No. NC2018/0009784, dated Jul. 14, 2021. Translation provided by Clarke Modet & Co.
Third Office Action regarding Mexican Patent Application No. MX/a/2016/015722, dated Apr. 16, 2021. Translation provided by Clarke Modet & Co.
First Office Action regarding Peruvian Patent Application No. 1588-2018/DIN, dated Oct. 25, 2022. Translation provided by Clarke & Modet Co.

* cited by examiner

INTERACTIVE PAINT PRODUCT SELECTION AND ORDERING SYSTEMS, METHODS, AND NON-TRANSITORY COMPUTER READABLE MEDIUM

CROSS REFERENCE TO RELATED APPLICATIONS

This application is a continuation of U.S. application Ser. No. 15/355,736, filed Nov. 18, 2016, which claims the benefit of and priority to U.S. Provisional Patent Application No. 62/263,464, filed Dec. 4, 2015, and entitled, "INTERACTIVE PAINT PRODUCT SELECTION AND ORDERING METHODS AND APPARATUS," the contents of which is incorporated herein by this reference in its entirety.

FIELD OF THE DISCLOSURE

The subject disclosure relates to paint product selection and ordering methods and apparatus, as well as to methods and apparatus for selling paint products in stores that traditionally do not sell paint.

RELATED ART

In the past, paint products have been sold at traditional retail paint stores, which are required to maintain inventory and paint formulation equipment such as tinting and mixing equipment, as well as display racks for such items as paint, paint chips, brochures, etc. Such stores must further employ personnel having detailed knowledge of paint products and paint formulation procedures.

SUMMARY

According to one illustrative embodiment, a paint product selection and ordering method and apparatus is provided wherein a single page interactive display is generated on a computer controlled display device, the single page comprising a paint product selection panel and an adjacent shopping cart panel. In an illustrative embodiment, the paint product selection panel comprises a plurality of sections comprising a sheen selection section, a color selection section, and a paint quantity selection section, and the interactive screen display is configured to enable a user to create a first paint order for a first color in the paint product selection panel and subsequently transfer that first paint order to the adjacent shopping cart panel. Upon such transfer to the shopping cart panel, the paint product panel is refreshed so as to enable the user to create a second paint order for paint of a different color and transfer that second paint order to the shopping cart panel such that the first and second orders appear in the shopping cart panel.

More particularly, in one embodiment, the single page interactive display is configured to (a) enable a user to perform a first plurality of selection operations on the product selection panel to select a first order comprising a first paint color, a sheen for that first paint color, and a quantity of paint having the first paint color; (b) enable the user to cause the first order to appear in the shopping cart panel and to thereafter cause the product selection panel to refresh back to a default state wherein a second order may be created on the product selection panel; (c) enable the user to perform a second plurality of selection operations on the product selection panel to select a second order comprising a second paint color, a sheen for that second paint color, and a quantity of paint having the second paint color; and (d) enable the user to cause the second paint order to appear in the shopping cart panel adjacent the first order. In illustrative embodiments, the second order or other orders may comprise an order for other paint related items such as primers, sundry items such as brushes or rollers, or collateral items such as paint chips or marketing brochures.

Various embodiments may include the ability to remove selected items from the order on the shopping cart panel or to change various characteristics of items ordered. Various embodiments may further enable selection of various paint related products in the paint product selection panel such as primers or various sundry items.

According to another aspect of the disclosure, methods and apparatus are provided for adapting stores which have not previously sold paint products to sell paint products of a coating manufacturer by providing a website comprising one or more servers, a data storage facility storing paint product catalog information, a lighting search engine, and a paint product ordering application. The paint product ordering application may be employed to interact with a browser present on a computer terminal at one of the stores to provide at least one paint product ordering web page to the computer terminal and to update the web page in response to operations initiated by a user of the computer terminal to enable the user to search for a suitable paint product and to create and store an order for that paint product. In one embodiment, the web page may be a single interactive page comprising a paint product selection panel and shopping cart panel, as described above.

The website may be further configured to automatically transmit the order to a coating manufacture facility which thereafter creates, packages, and ships the paint product. In this manner, a store which has previously not sold paint products can be adapted to sell paint products, while avoiding various drawbacks attendant to traditional retail paint stores, such as the necessity to maintain inventory and paint formulation equipment such as tinting and mixing equipment, as well as display racks for such items as paint, paint chips, brochures, etc., and the necessity to employ personnel having detailed knowledge of paint products and formulation procedures. The store may thus employ its customary design/sales personnel to interact with a customer to select paint and paint related products with only a modicum of additional training for such personnel.

BRIEF DESCRIPTION OF THE DRAWINGS

FIG. 9 illustrates and adds to cart operation using the web page of FIG. 6;

FIG. 12 shows the addition of the item selected in FIG. 11 to the shopping cart panel of the page of FIG. 6;

FIG. 13 illustrates removal of an item already selected using the web page of FIG. 6;

FIG. 15 illustrates the display provided after use of the "Change" link;

FIG. 16 illustrates use of a Primer button provided on the web page of FIG. 6;

FIG. 18 illustrates the selection of sundries items using the web page of FIG. 6;

FIG. 19 illustrates the shopping cart panel after selection of sundries items in connection with FIG. 18.

FIG. 22 illustrates a "save for later" display screen according to an illustrative embodiment.

DETAILED DESCRIPTION OF THE PREFERRED EMBODIMENTS

Figure 1:
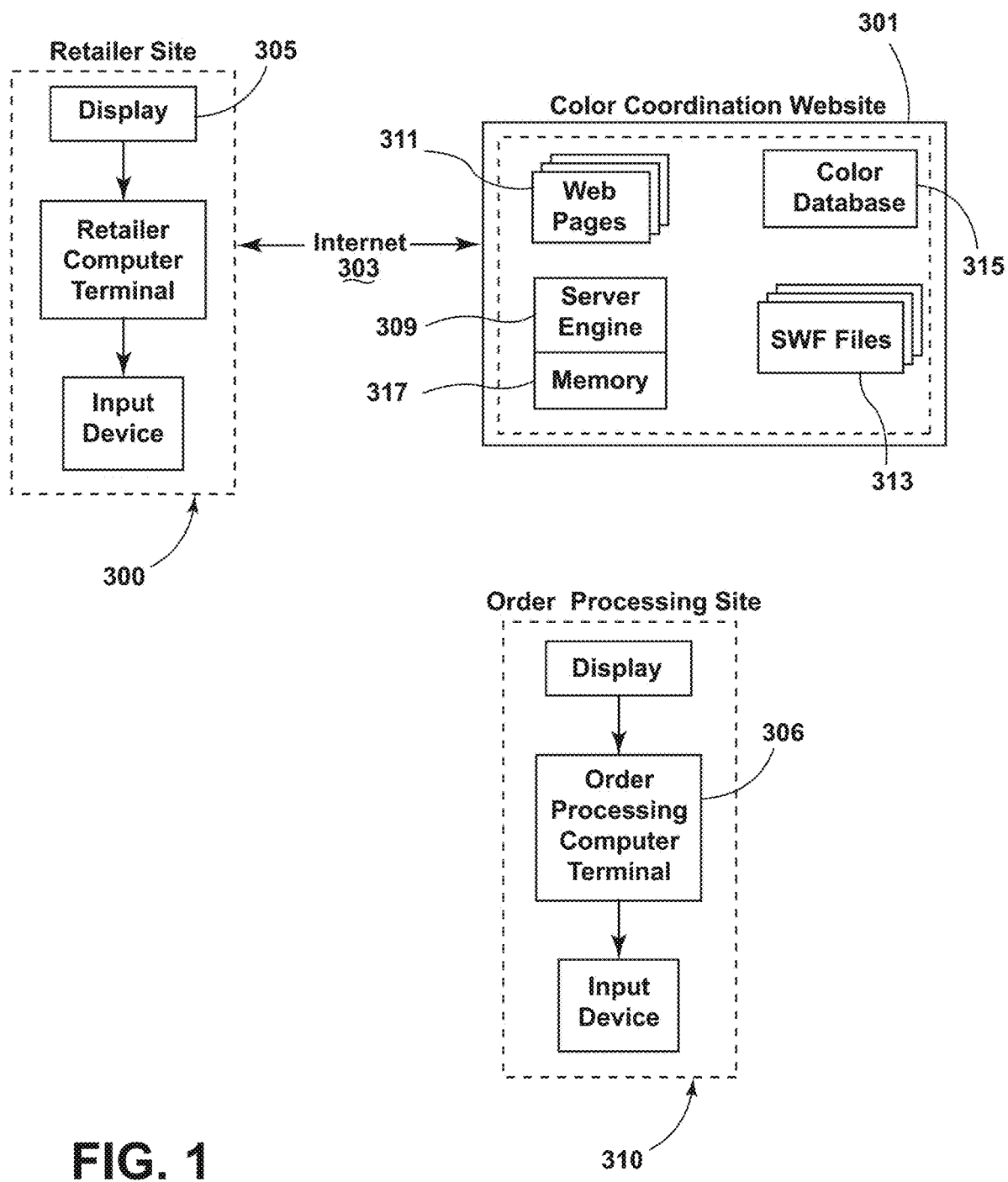
FIG. 1 is a system block diagram illustrative of apparatus for performing methods as described herein.

FIG. 1 illustrates a block diagram of a system in which a remote retail site computer 300 may access a paint color selection and coordination website 301. The website 301 may be coupled to the Internet 303 in order to provide access to a large number of remote terminals/computers 300. Each remote retail site computer 300 controls a display apparatus 305, which may comprise, for example, one or more CRTs or flat screen computer monitors or displays. Another remote computer 310 may comprise an order processing computer terminal 306 whose functionality is discussed in more detail below.

The website 301 may comprise a server engine 309 comprising one or more computers, or servers, associated memory 317 and server software such as a server operating system and server application programs. The website 301 is arranged to store and transmit a plurality of related documents or webpages 311 in digital format, for example, such as HTML documents, and further may include a color data base 315 where color data is stored as described, for example, in U.S. Pat. No. 7,999,825, entitled, "Color Selection and Coordination System," incorporated herein by reference in its entirety. It will be appreciated that the computer controlled display apparatus transforms the digital format webpages into static and/or animated interactive visual images for an end user. The associated memory 317 may comprise a computer readable digital storage media or medium, such as, for example, hard disc storage.

A user may interact with the website 301 over the Internet 303 or other communication medium or media via selection operations performed on webpage display screens presented to the user via the display apparatus 305 of a remote computer 300. Such selection operations may be performed by, for example, a keyboard, a cursor directed by a mouse, track ball, touch screen or other data entry means. In such a manner, various links presented on the display apparatus 305 may be selected by various point and click, point and touch, or other selection operations. Various display screens and functionality of illustrative embodiments will now be described.

In various embodiments, remote computers 300 may comprise or form part of a computer terminal, a personal digital assistant (PDA), a wireless telephone, a "smart phone," a laptop, desktop or notebook computer, and/or the like. In various embodiments, the communications medium or media may comprise a local area network (LAN), a wide area network (WAN), a wireless network, an intranet, an Internet, and/or the like.

In one embodiment, web site functionality may be implemented in non-transitory software stored on a computer readable storage medium or media and executed by a suitable device, for example, such as one or more digital processors or computers, which may comprise part of a web server or other suitable apparatus. In other embodiments, such software can be located on a personal computer or similar device to generate displays on a flat panel or other display device at a user site without involvement of a server or the Internet. In such case, display screens are generated which may have the same content as webpages, such that the terms "webpage," "screen display," "display," and similar terms are used interchangeably herein. Illustrative screen displays and functionality of an illustrative embodiment may be implemented in one or more application programs, which may be written in, for example, HTTP, PHP, MySQL, JavaScript, XMPP Server, Solr Server, LAMP technology stack, Java, Laszlo Presentation Server or C++ and, which may run, for example, on a Windows XP or other operating system. Various display screens and functionality of illustrative embodiments are described below. Further, as shown in FIG. 1, the website 301 may include one or more small web format (SWF) files 313 to implement portions of the web pages 311, such as animation elements, applet elements, multimedia content, etc.

Figure 2:
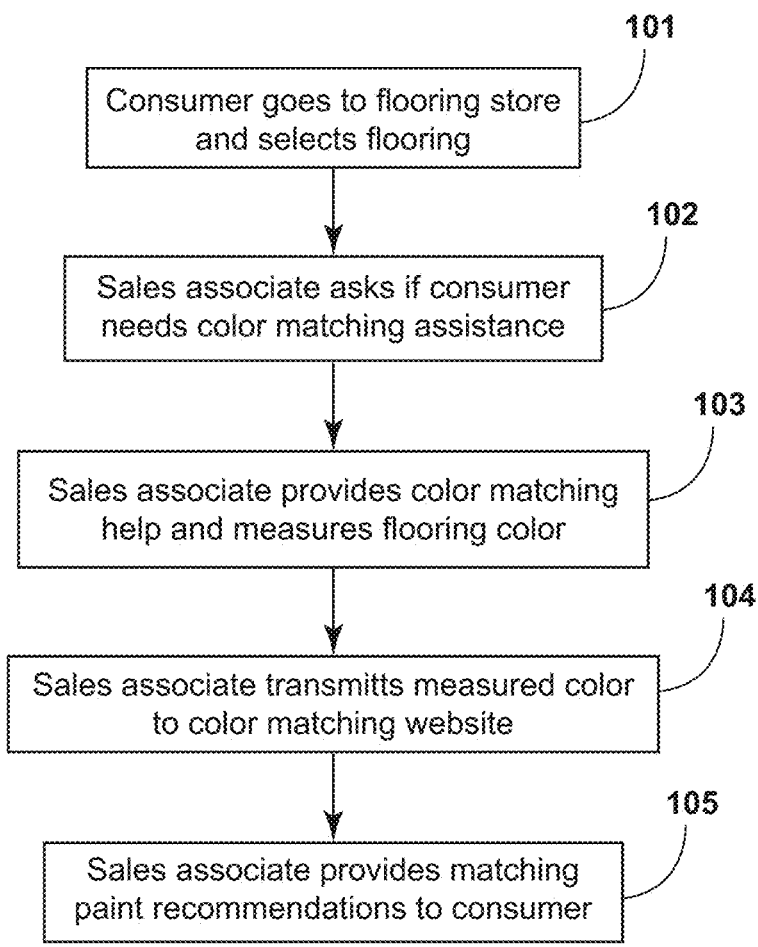
FIG. 2 is a flow diagram illustrating initial steps of an illustrative method.

According to an illustrative method shown in FIG. 2, a consumer who wishes to buy flooring for a home, for example, goes to a flooring store location and selects the flooring (step 101). The consumer meets with a flooring sales associate who asks if the consumer needs help with paint and/or paint color matching (step 102). If the consumer needs color match help, the sales associate measures the color of the flooring using a spectrophotometer or other suitable device (step 103). The flooring sales associate then employs a retail site computer 300 to transmit the measurement to a color matching website application program, for example, such as ColorSmart® by Behr Process Corporation (step 104). The associate obtains matching paint recommendations, and provides them to the customer/consumer (step 105). Illustrative color selection and coordination functionality and the manner of implementing same in website and other environments, as well as paint sample order and purchase mechanisms, are described in U.S. Patent Application Publications 2014/0075361 A1 and 2008/0228599 incorporated by reference herein. Although the present example of a flooring store is provided, the present teachings are applicable to any store that does not traditionally sell paint products, such as stores that sell products for construction, home improvement, home goods, interior decorating, and/or re-modeling projects, as well as other stores that sell home-related goods, such as furniture, home decorations, etc.

Figure 3:
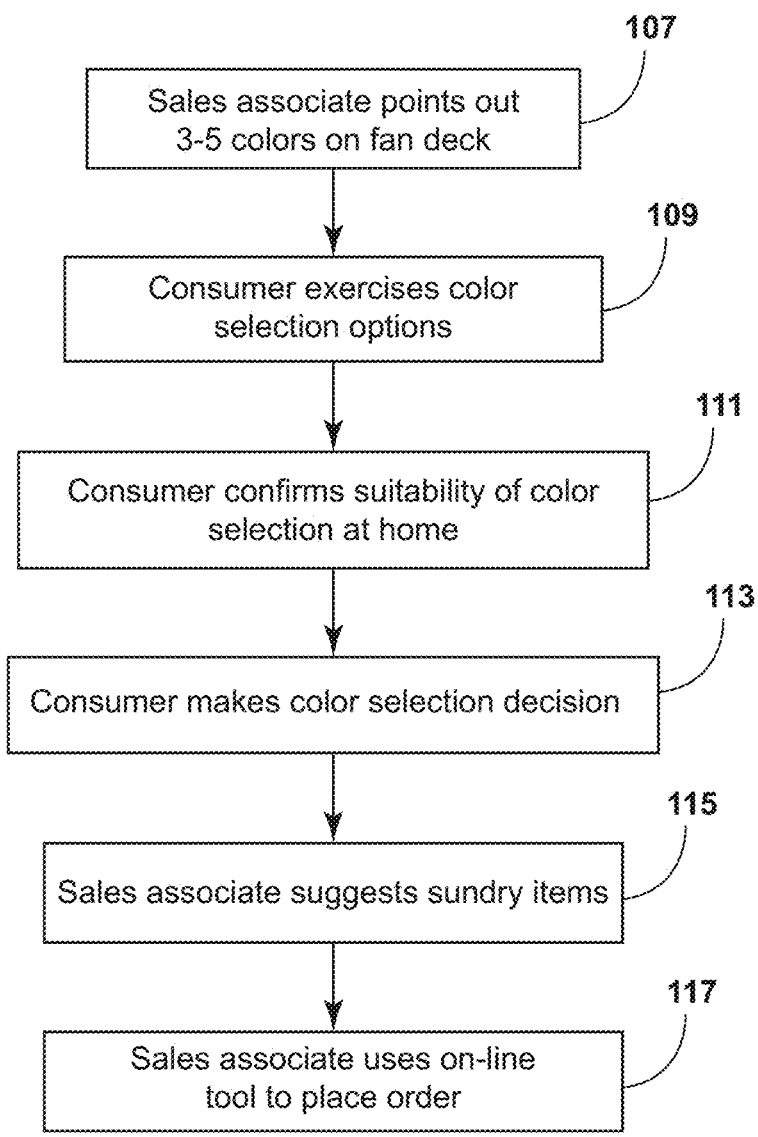
FIG. 3 is a flow diagram illustrating subsequent steps in the method of FIG. 2.

In one embodiment, the flooring sales associate may suggest 3-5 colors, for example, by providing the consumer with a color fan card or fan deck and pointing out the 3-5 colors as illustrated at step 107 of FIG. 3. The consumer may then have the option at step 109 of (a) checking out the fan deck to take home (b) ordering a wet sample of one or more colors, packaged, for example, in small "sample size" jars or cans or (c) picking a color choice and placing an order for paint having the selected color. The consumer could also be provided with color chips of the 3-5 colors to take home. In various embodiments, wet paint samples may be provided in a bottle with an applicator such as a brush or sponge, or a smaller foil packet type dispenser, e.g., similar to a ketchup packet type dispenser may also be employed.

In the case of option (a) or (b), the consumer can take the fan deck or paint sample home, step 111, to confirm the suitability of one or more particular colors for the particular project which the consumer has in mind. Once the consumer has made a selection decision, step 113, the sales associate may suggest purchase of additional related items, such as paint brushes and the like, step 115. In one embodiment, once the consumer has determined to order paint and/or other items, the flooring sales associate uses an on-line tool accessed via a retail site computer, e.g. 300, to order the products, step 117.

Figure 4:
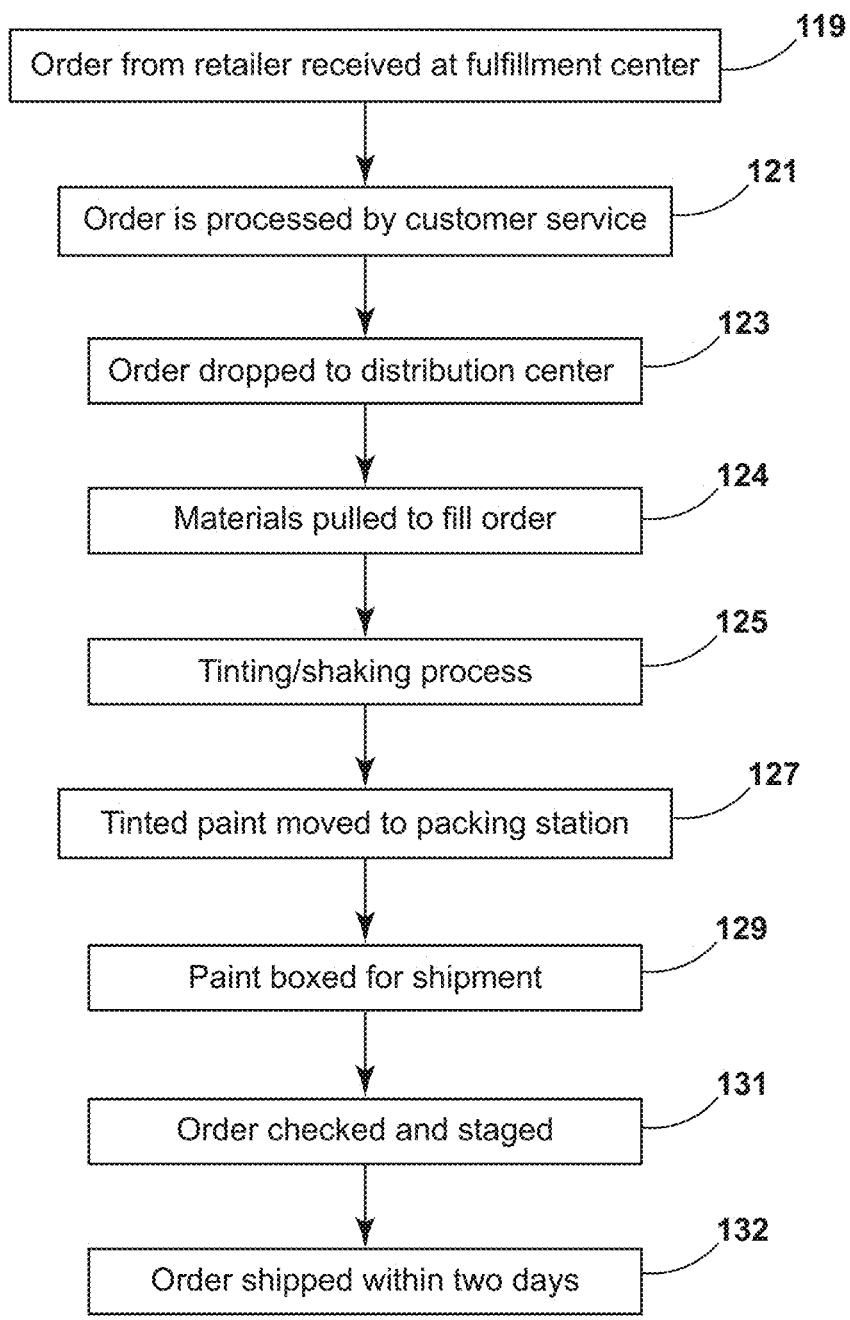
FIG. 4 is a flow diagram illustrating order fulfillment steps according to one embodiment.

FIG. 4 shows illustrative order fulfillment steps according to an illustrative embodiment. According to this embodiment, the on-line order is first received at a fulfillment center computer terminal 306, step 119, whereafter customer service processes the order, step 121. The order is then dropped to a distribution center, step 123, the materials are pulled to fulfill the order, step 124, and the paint is formulated and moved through a tinting and shaking stage, steps 125, 127. In one embodiment, the order fulfillment computer may communicate directly with a retail site computer, while in another embodiment, the order may be directed to the website 301 and then to the order processing terminal 306.

Thereafter, the tinted paint is moved to a packaging station and boxed for shipment, step 129. Additional items, such as color chips may also be packaged, for example, with orders of paint samples. The paint orders are thereafter checked, staged for shipment, step 131, and shipped, step 132, for example, within two days of receipt of the order. Shipping and tracking information may then be sent to the consumer, and the order delivered, for example, within 3-5 days of receipt of the order.

Figure 5:
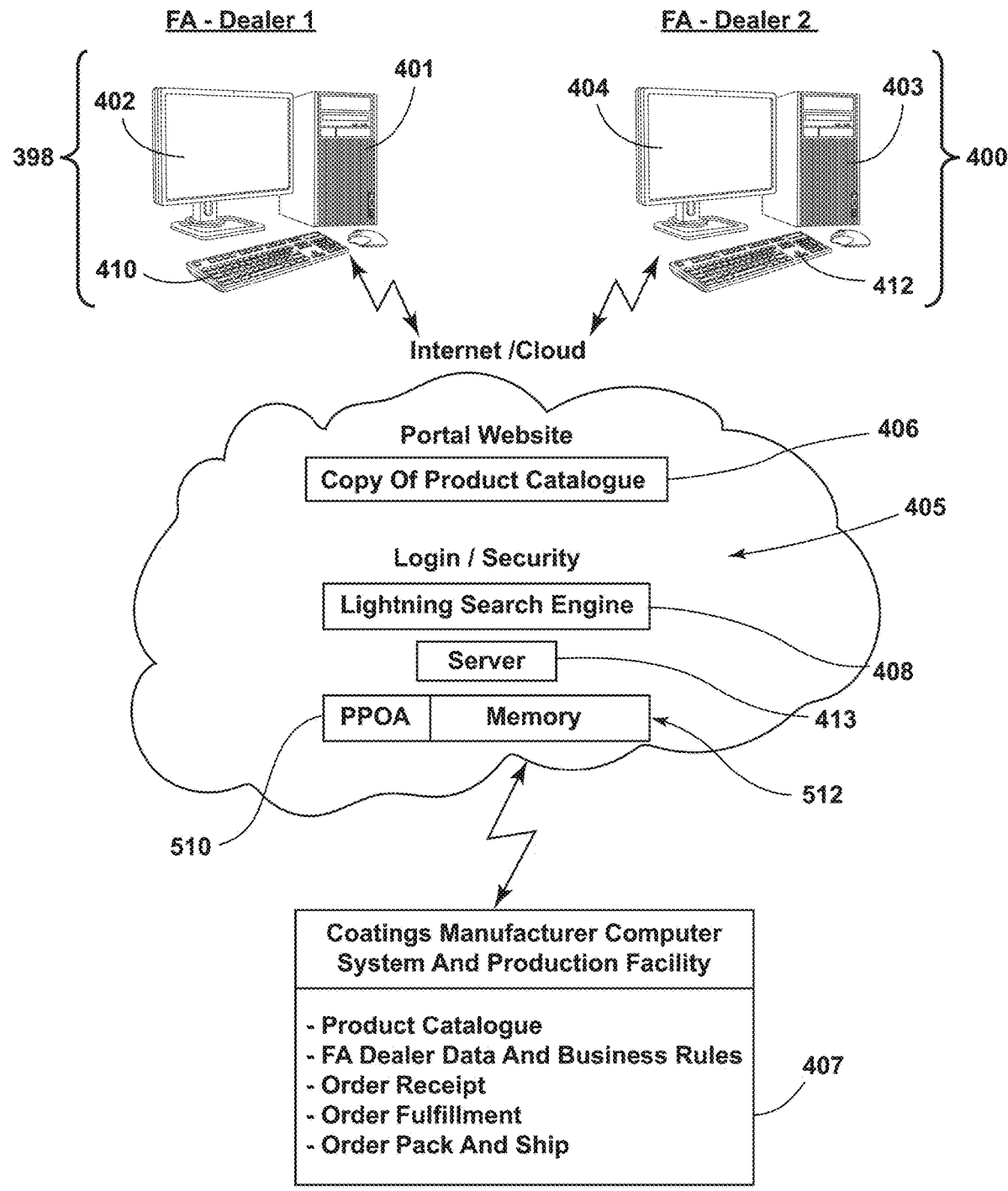
FIG. 5 is a system diagram of an alternate embodiment for performing methods described herein.

FIG. 5 illustrates another embodiment of a system configured to readily enable retail outlets or stores which do not traditionally sell paint products to sell paint products along with their traditional products, for example, such as flooring or other products employed in construction or re-modeling projects. As mentioned above, while an present example of a flooring store is provided, the present teachings are applicable to any store that does not traditionally sell paint products, such as stores that sell products for construction, home improvement, home goods, interior decorating, and/or re-modeling projects, as well as other stores that sell home-related goods, such as furniture, home decorations, etc. According to the system of FIG. 5, the only technology which the first and second flooring dealers need to set up to sell paint products is an internet connection and browsers 401, 403, running on suitable computers or computer terminals 398, 400, having respective computer-controlled display devices or display apparatus 402,404 and input selection devices 410, 412 various types of which are discussed above (keyboards, mouse, etc.).

A cloud-based website 405 provides a portal to the browsers 401, 403. The website 405 includes a backend database 406 of available paint related products, which, in one embodiment, may comprise a coating manufacturer's product catalog, and may further include log-in/security logic, and a lightning search engine 408. The discussion of FIG. 1 above concerning various and alternate implementations of various components and system aspects is generally applicable to the system of FIG. 5. For example, in one embodiment the server 413 may comprise a server engine comprising one or more computers or servers, along with associated memory and server software such as a server operating system and server application programs.

In operation according to one embodiment, when a user clicks on an icon or button or adds items to a shopping cart as described below, the processing is performed in the cloud, for example, by an application 510 stored in memory 512 running on the cloud server 413, and responsive updates to the web page, e. g. 201, FIG. 6, such as appearance of items in a shopping cart panel or the addition of a quantity such as "1" when a "+" button is clicked in a quantity section of the web page are caused to be made by the cloud server 413 or other computing apparatus. Of course such updates could be caused to be made locally or otherwise in various other embodiments.

In operation of an illustrative embodiment, a dealer logs onto the website 405 via a browser, e.g. 401, searches for paint related products, and places orders in a shopping cart all from an application 510 stored in memory 512 based in the cloud website 405 as hereafter described. Once an order is submitted, it is sent by the cloud website 405 to the coating manufacturer's facility or system 407 where the order is received by a computer system and thereafter processed, fulfilled and shipped to a customer or to a dealer store. In one embodiment, the product catalog and master information (pricing, available products, dealer store information, etc.) are stored in the system 407. In one embodiment, the product catalog is replicated at the cloud site 405 so that the lightning search engine 408 can index the data and search it more efficiently.

For the purposes of this disclosure, "memory" or databases as disclosed herein, for example, in FIGS. 1 and 5 may comprise a computer readable medium or media which stores computer data, which data can include computer program code that is executable by a computer, in machine readable form. By way of example, and not limitation, a computer readable medium may comprise computer readable storage medium or media, for tangible, physical or fixed storage of data and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor. In certain embodiments, when suitable computer program code is loaded into and executed by a computer, the computer becomes a specially configured apparatus.

In one embodiment, the cloud server portal only communicates with dealers as opposed to, for example, a central corporate office. In such and embodiment, dealer-corporate communication is outside of the system.

Figure 6:
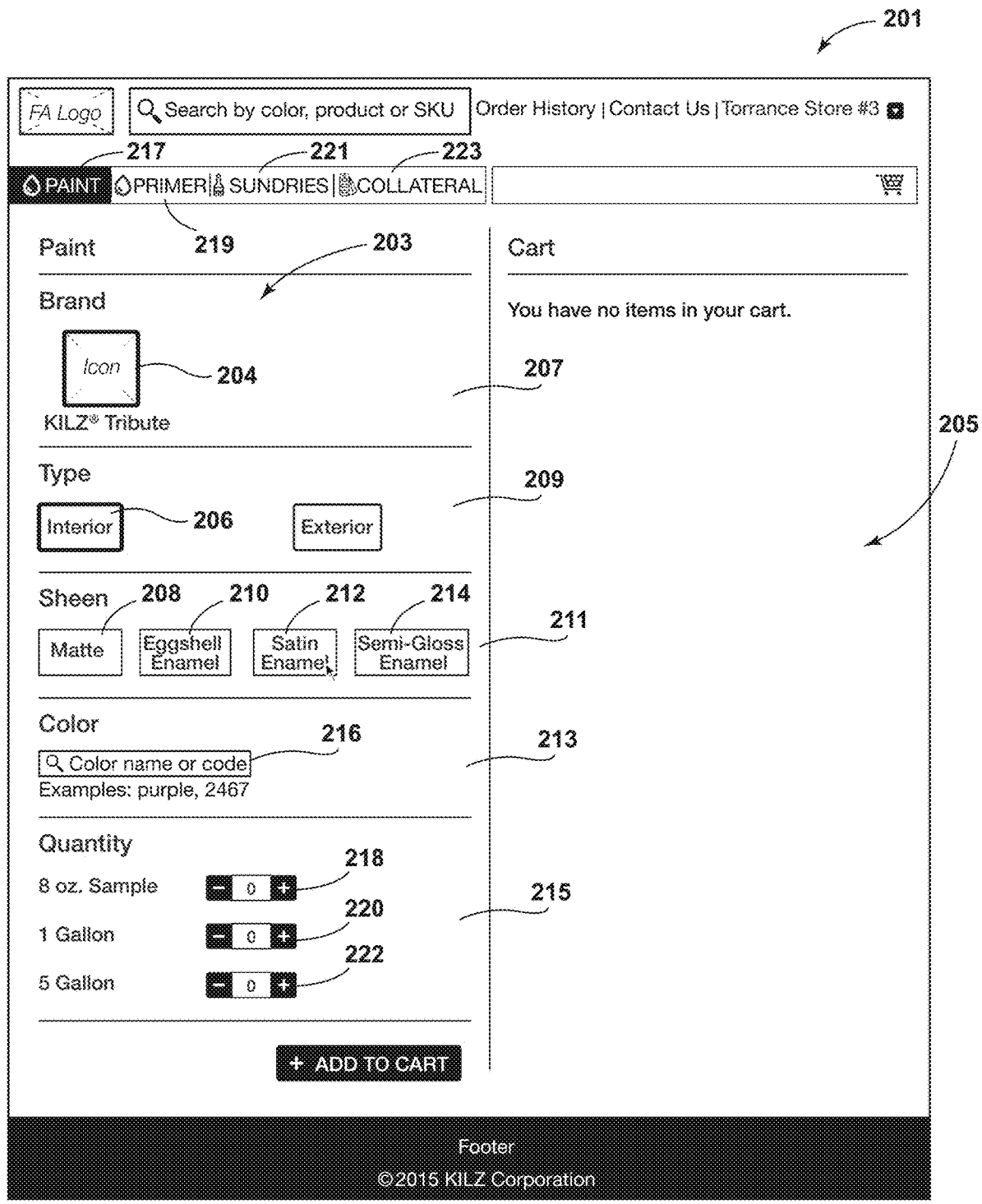
FIG. 6 illustrates one embodiment of a web page or screen display providing a paint product selection panel and a shopping cart panel on a single page.

FIG. 6 illustrates a web page or computer screen display 201, which, in an illustrative embodiment, is made available or provided to respective dealer or retailer browsers, e.g.

401, 403. The web page or screen display 201 provides a paint product selection panel 203 and a shopping cart panel 205 on a single page.

In the illustrative embodiment, the paint product selection panel 203 occupies a first half of the page 201, and the shopping cart panel 205 occupies the second half. Across the top of the page 201 are product selection buttons or icons 217, 219, 221, 223, which permit selection and display of various paint related products in the product selection panel 203, for example, such as paint, primer, sundries and collateral, as discussed in further detail below. In the illustrative embodiment, the respective panels 203, 205 are constructed such that they can be vertically scrolled independently of one another, i.e., the paint product panel 203 can be scrolled while the shopping cart panel 205 remains static.

In one illustrative embodiment, the paint product selection panel 203 comprises a column of a plurality of rectangular sections 207, 209, 211, 213, 215. The first section 207 displays a paint brand designation in a rectangle 204. The second section 209 displays a paint type designation, such as interior or exterior, in a rectangle 206. The third section 211 displays four selectable paint sheens, for example, matte, eggshell enamel, satin enamel and semi-gloss, in respective rectangles 208, 210, 212, 214. The fourth section 213 comprises a color selection section where a color name or code may be entered into a rectangle 216. The fifth and final section 215 is a quantity selection section, where a quantity of paint may be selected employing respective selection text field and controls 218, 220, 222, providing selection, for example, of one or more of an 8 ounce sample, a one gallon can or a five gallon can of a selected paint type. It may be noted that in various embodiments, the paint brand and type sections 207, 209, may display a single brand and/or type, or may provide selection between brands or types of paint.

Figure 7:
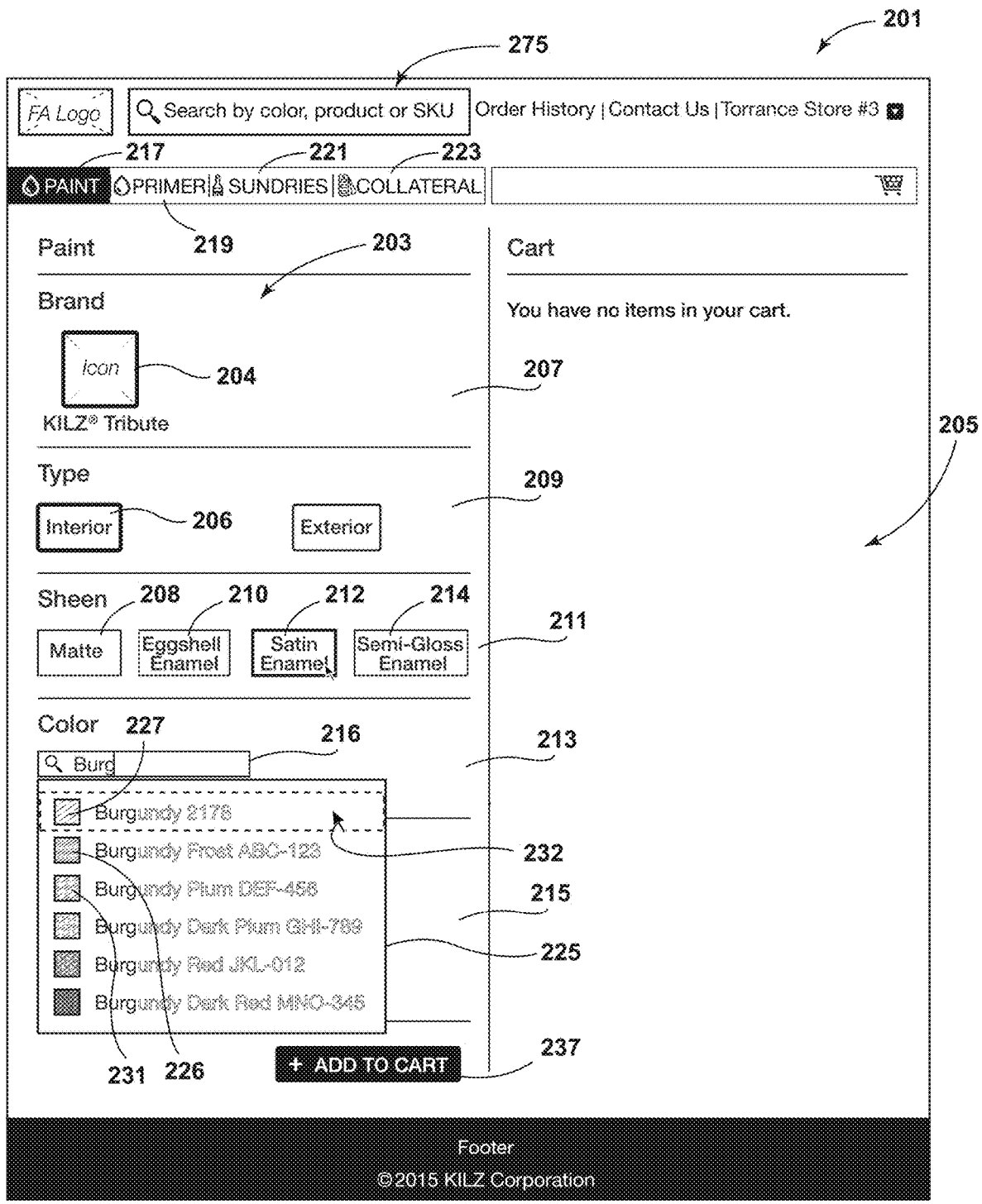
FIG. 7 illustrates selection of a paint color using the web page of FIG. 6.

FIG. 7 illustrates the web page 201 after a brand of paint, type of paint, and sheen have been selected (Kilz, interior and satin enamel), as indicated, for example, by a highlighted or bolded border imparted to the three rectangles in sections 207, 209 and 211. FIG. 7 further illustrates selection of a paint color according to one embodiment. In particular, as the first few letters of a name of a selected color are entered into the rectangle 216, for example by a computer keyboard or other data entry mechanism, a menu 225 appears, displaying the available types or shades of that selected color listed adjacent a square which shows the particular shade. For example, in the illustrative embodiment of FIG. 7, when the main color selected is entered as "Burg," selected shades and associated identifying color codes appear in the menu 225. In this menu 225, squares, e.g., 227, 226, 231, show respective available shades, such as "Burgundy," "Burgundy Frost," "Burgundy Dark Plum," etc., along with a corresponding alpha numeric color code.

Figure 21:
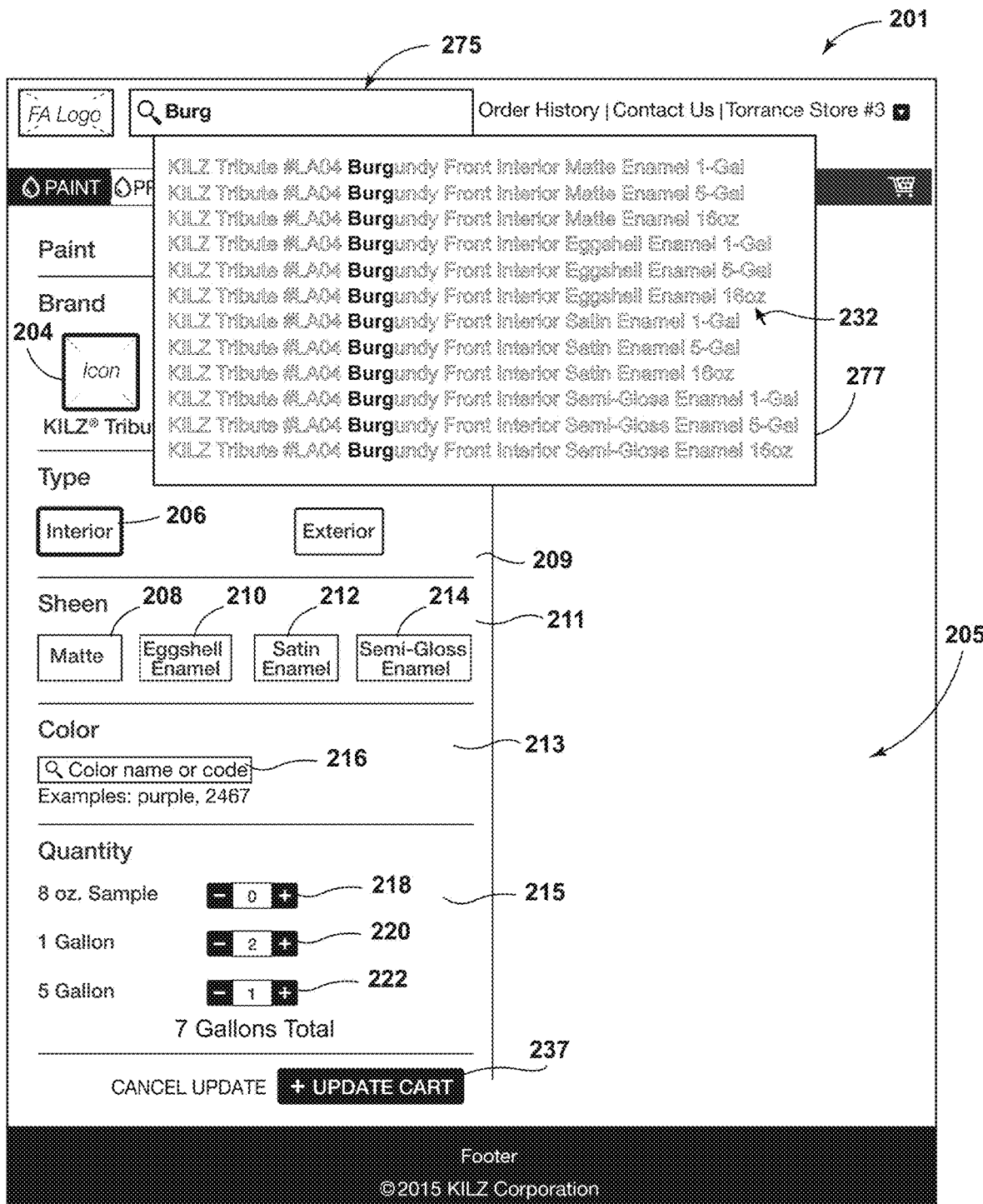
FIG. 21 illustrates application of a "lightning search" procedure in a search block of the web page of FIG. 6.

It will be appreciated that, in one embodiment, the paint selection technique just described may employ a "lightning search" procedure, which enables immediate selection of a paint product from a large database and addition of it to the shopping cart panel 203 with two clicks on the same web page 201, for example, by employing a cursor 232 to click the selected color and then clicking "Add To Cart" button 237. As shown in FIG. 21, the same lightning search technique can be employed with respect to search terms inputted to the search block 275 at the top of the page 201, which results in an adaptive search and display of results 277 in real time. Selection of one of the items via the cursor from menu 277 results in display of that selected item in the "Color" rectangle 216.

An illustrative lightning search mechanism may be implemented using the open source framework typeahead.js (https://twitter.github.io/typeahead.js/) as the starting point, with customization and data formatting performed. When a user logs in, the cloud server application fetches all catalog data from the backend database, transfers it into the browser's memory, and reformats that data so it is suitable for the lightning search function. When the user types his or her search term into the search text box, the search function goes through the data in memory and returns matching results to the user. When the user chooses one of the search results from the list of matching results, for example, a particular paint type, the application executes the logic that filters which sheen, type, and sizes (quantities) are available for that item (based on the catalog data) and displays the options accordingly. In one embodiment, options are "grayed out" (not allowed for selection) if not available. When the user clicks on the "ADD TO CART" button 237, the relative information linked to the item (color id, material id, size, etc.) is saved in memory for checkout.

FIG. 7 further illustrates a cursor 232 positioned to select the first shade 227 "Burgundy." In the illustrative embodiment, the shade on which the cursor 232 is positioned is highlighted or otherwise emphasized. Upon selection of the particular shade, in this case "Burgundy," the appearance of the panel 203 changes to that shown in FIG. 8 where the selected color name and adjacent chip 233 showing that color are displayed in section 213. A selection button 235 is also provided, and clicking upon that button 235 causes the color selector rectangle 216 to default to its empty state, as shown in FIG. 6.

Figure 8:
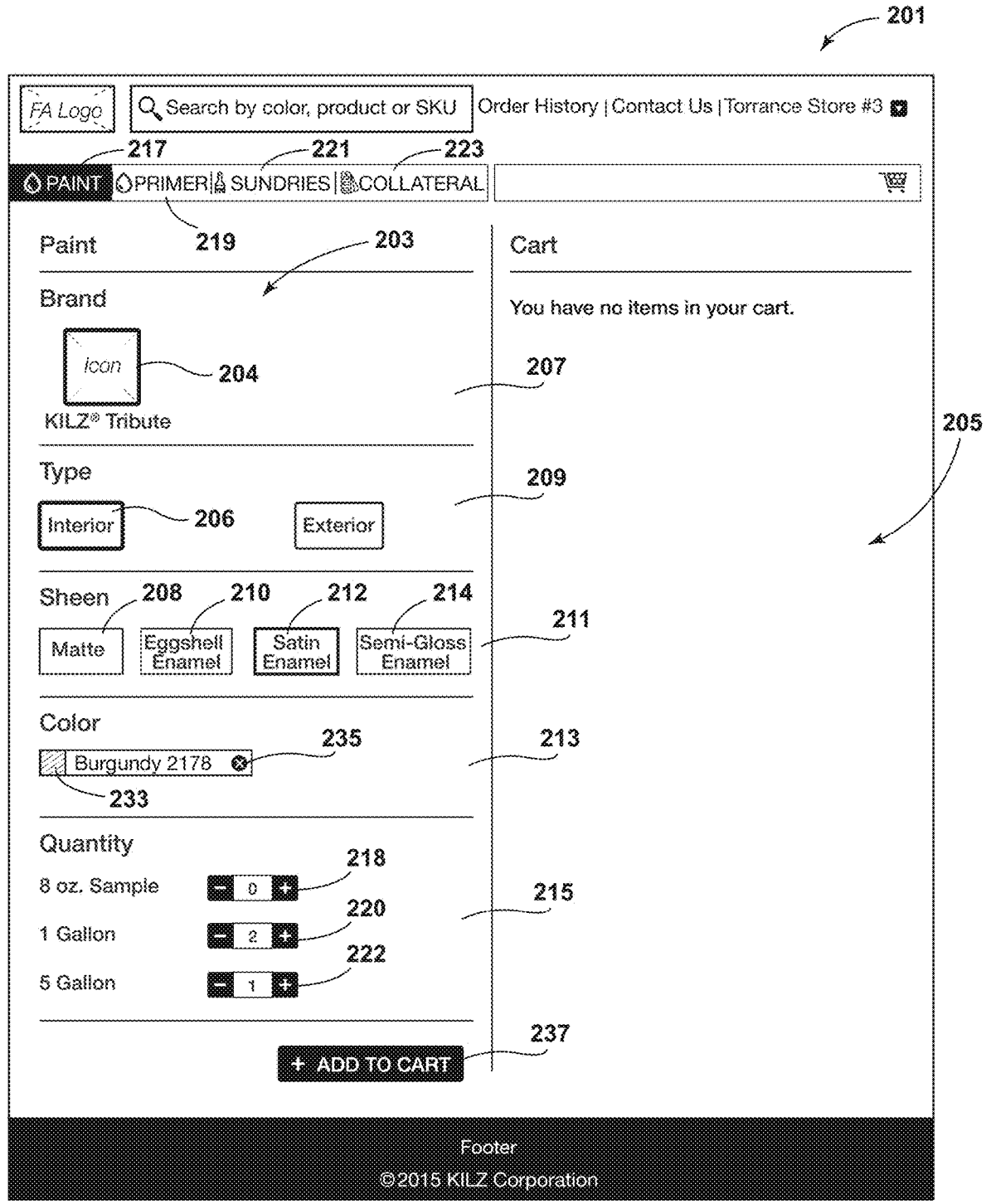
FIG. 8 illustrates selection of paint quantity using the web page of FIG. 6.

In FIG. 8, paint quantity selections have also been made of two one gallon cans and one five gallon can by clicking on the "+" controls of quantity selection controls 220 and 222. In one embodiment, if the quantity selection displayed is zero, the "minus" control is disabled to avoid display of a negative number. Additionally, if samples are not available for a particular color, the "sample" quantity control 218 may be disabled and an appropriate message displayed advising of the unavailability. Once appropriate selections have been made in all of the sections 207, 209, 211, 213, 215, the "Add To Cart" button 237 in the right bottom corner of the panel 203 becomes active and may be illuminated or otherwise highlighted to emphasize its active state.

Figure 9:
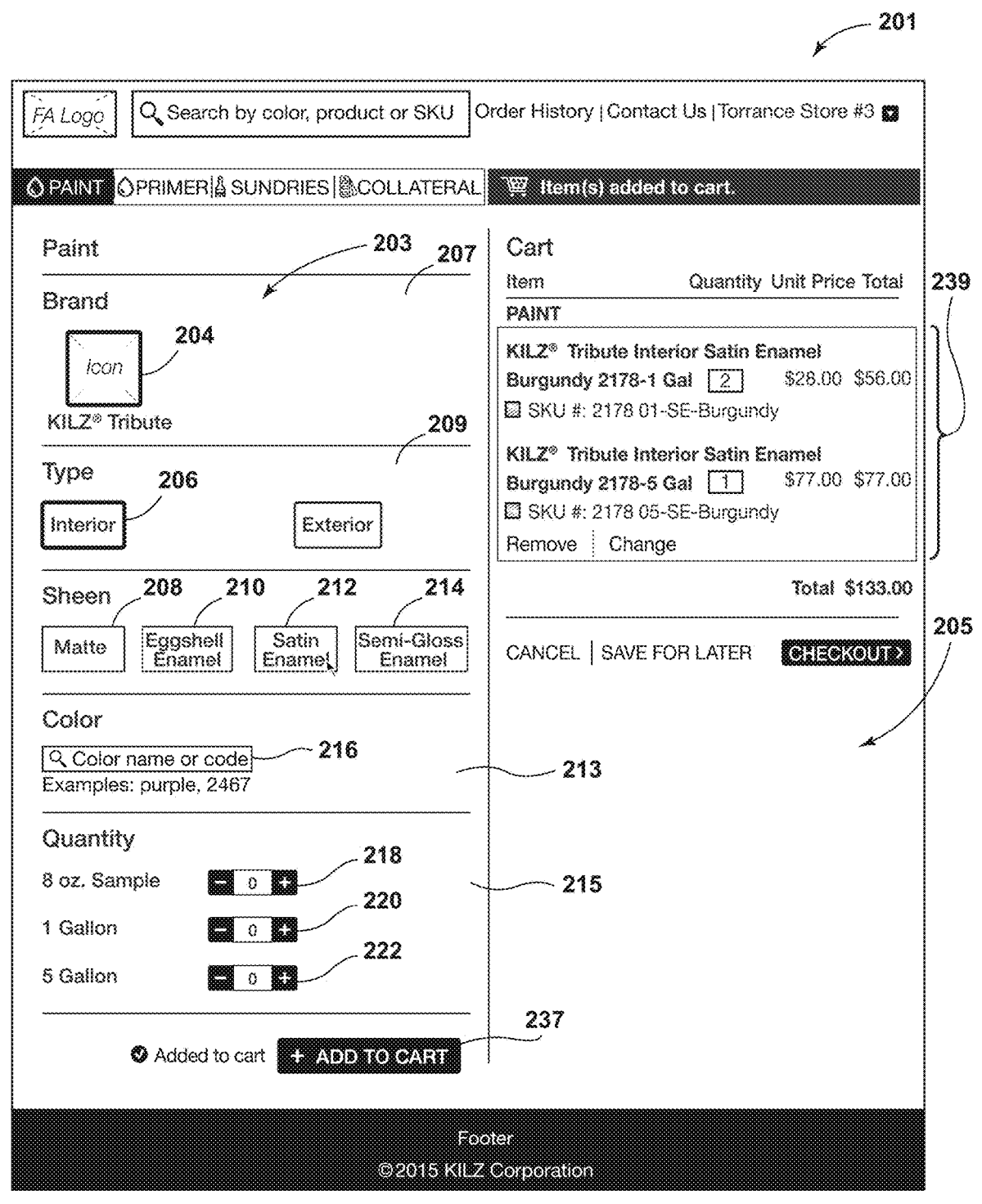

FIG. 9 illustrates the page 201 after clicking on the "Add to Cart" button 237. The items selected in the product panel 203 now appear in region 239 of the shopping cart panel 205, while the product panel 203 refreshes back to its default state of FIG. 6. In one illustrative embodiment, a confirmation alert such as "Added to Cart" appears adjacent the button 237, and the button 237 is disabled. The confirmation alert may be configured to disappear after a selected time interval, e.g., two seconds. In one embodiment, an additional confirmation alert may be overlaid on the cart panel 205, and the rectangle 239 containing the selected items may be provided with a tinted base fill to give focus to the added items for a selected time interval. In one embodiment, the additional confirmation and base fill may be configured to disappear after two seconds.

Figure 10:
FIG. 10 illustrates selection of a second paint color using the web page of FIG. 6.

In an illustrative embodiment, the product panel 203 is configured such that it may be used to order further products while the cart panel 205 continues to display the products selected up to this point, thus enabling the user to order additional items, for example, such as another color of paint to use for trim or accent purposes or primer or sundry items as discussed in further detail below. FIG. 10 illustrates the page 201 where selections have been made in sections 207, 209 and 211, and where a different color and color code, in this case "Teal 3827" has been selected. In one embodiment, this selection is made using the same lightning search mechanism illustrated in connection with FIG. 7, as further illustrated and in FIG. 11. In particular, when "Tea" has been entered into the color selection rectangle 216, all colors in the database which include those letters are displayed in the menu 225—in this case: "Winter Tea," "Tea Green," and two shades of "Teal."

Figure 11:
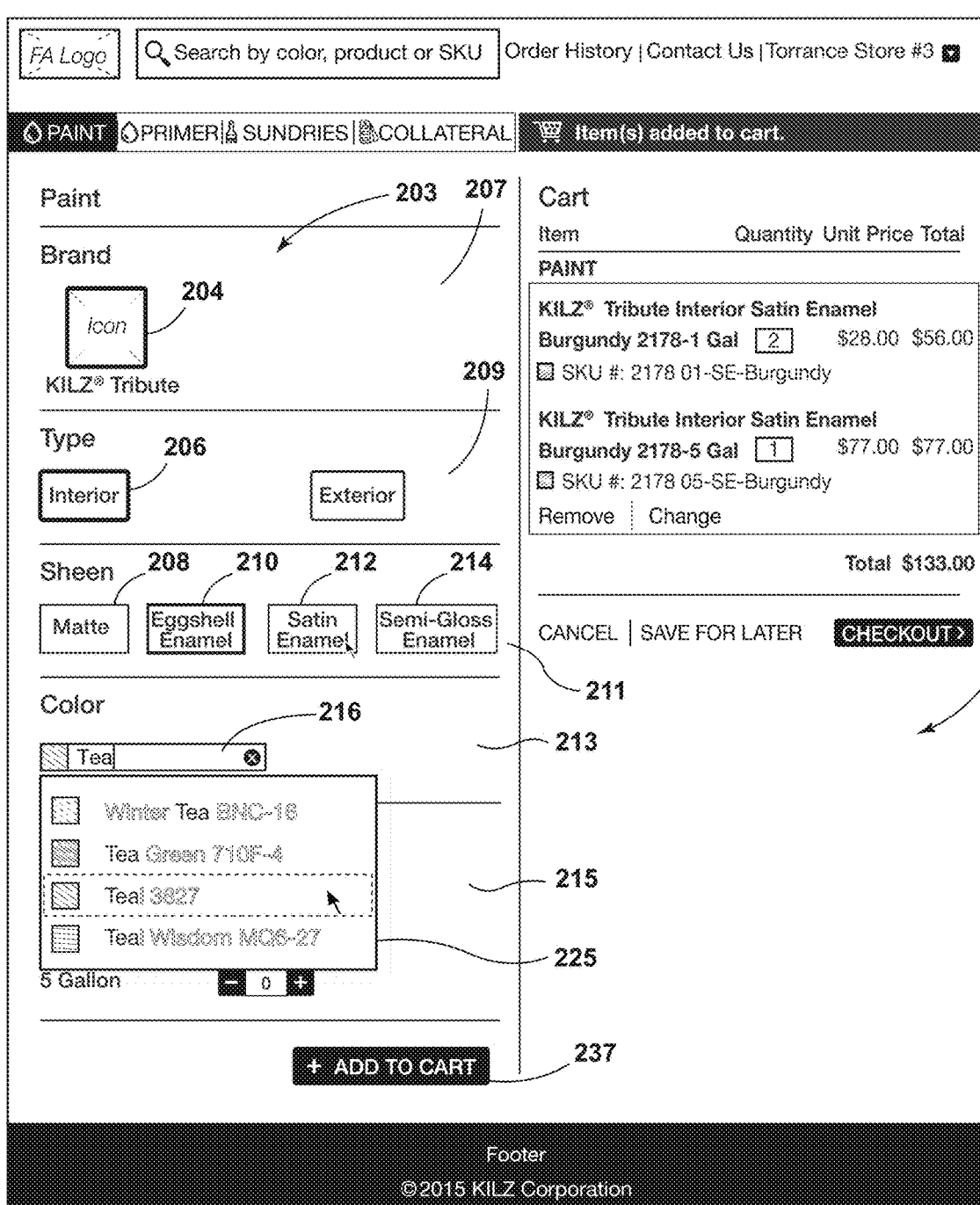
FIG. 11 illustrates application of a "lightning" search technique in connection with the paint color selection of FIG. 10.
Figure 12:
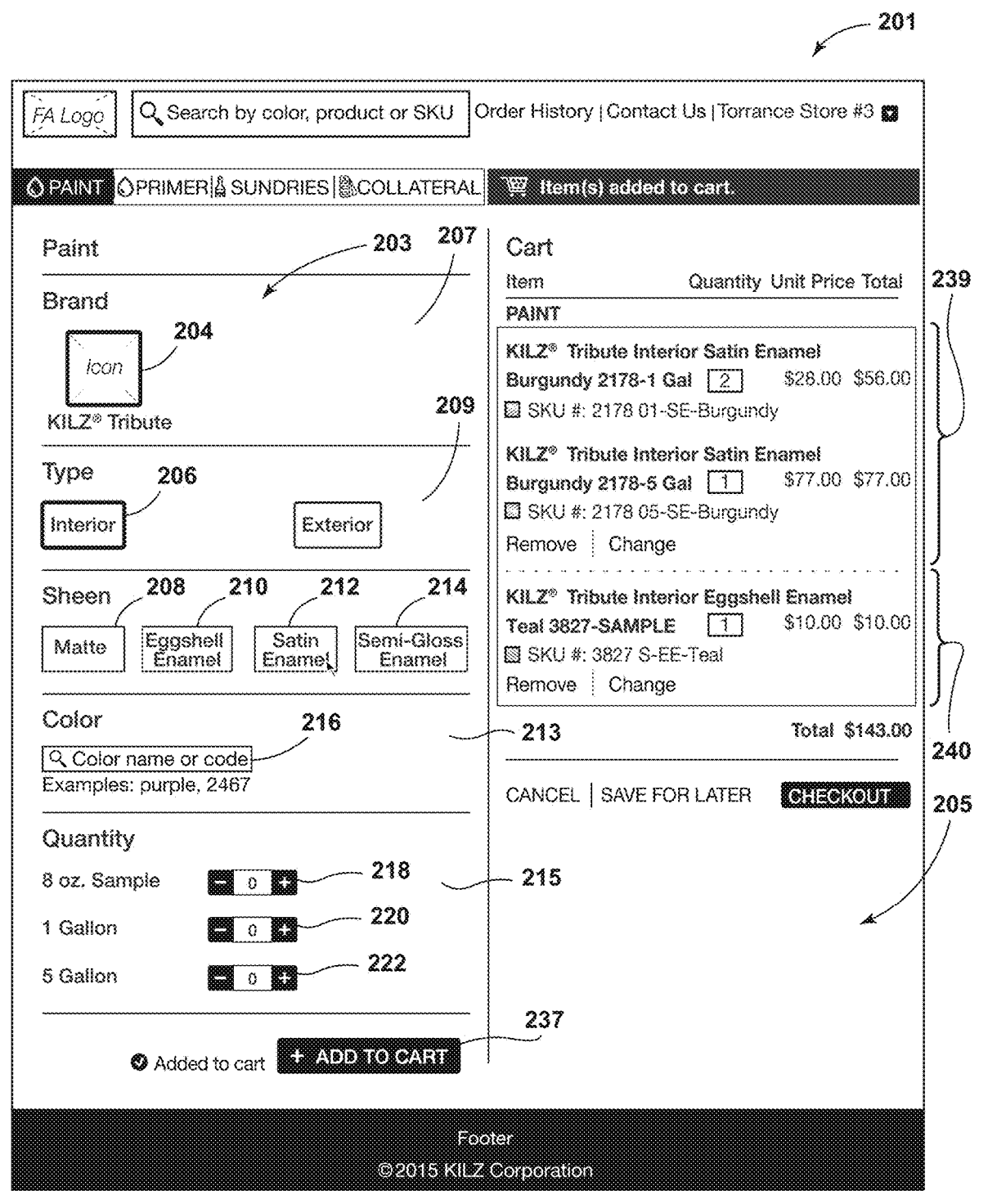
Figure 13:
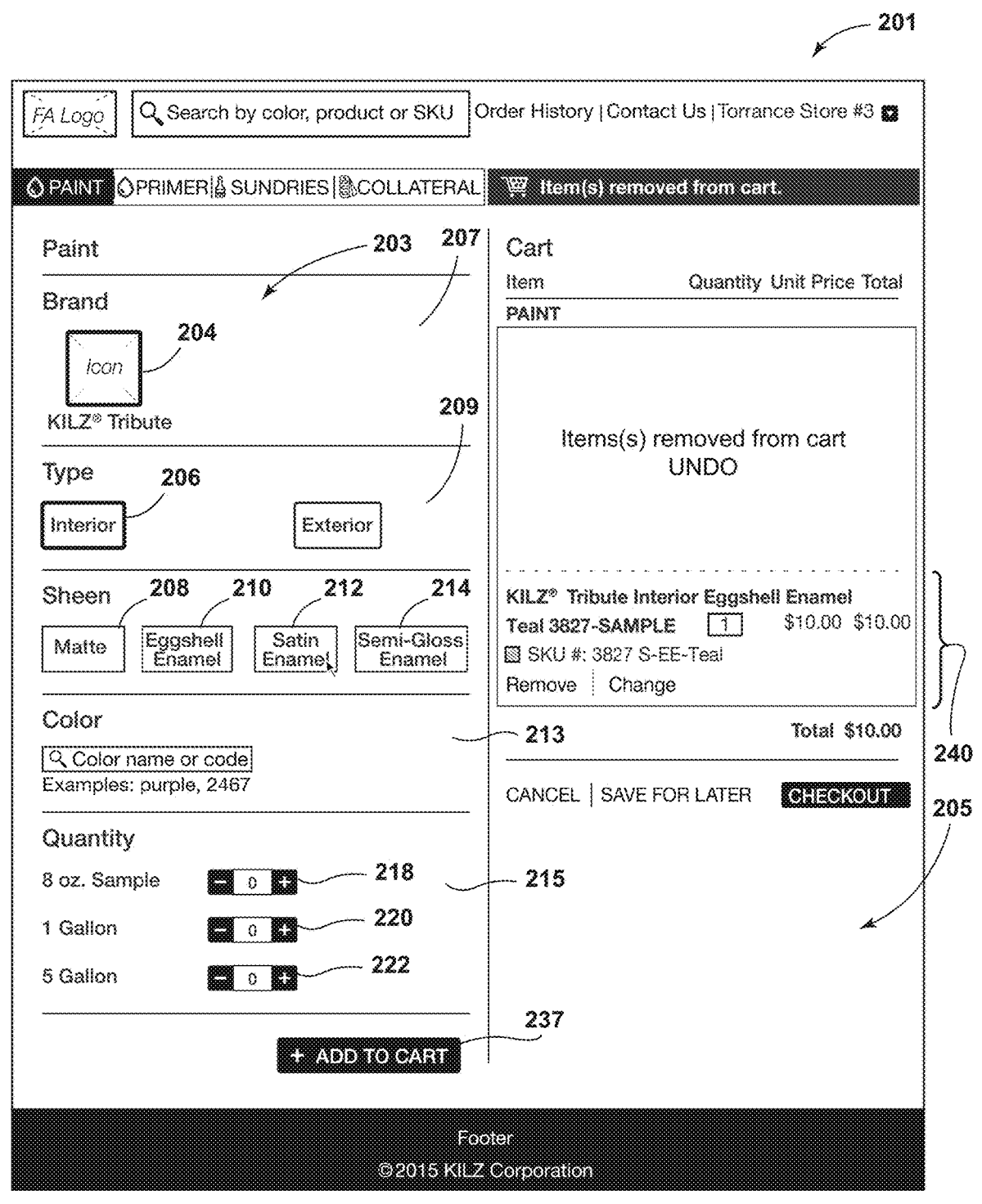

The item selected in FIG. 11 may then be added to the cart panel 205 as item 240, as shown in FIG. 12 using the same "Add to Cart" procedure and displays as discussed in connection with FIG. 9. In one embodiment, the quantity selected may be changed on the cart panel 205, and the total dollar amount adjusted accordingly. A selected item may also be removed by a selection operation, e.g. a mouse click on a "remove" button and the total dollar amount adjusted accordingly. A "removal" confirmation alert may also be displayed at the top of the cart panel 205 and in the row or rectangle where the item selected for removal is listed. FIG. 13 provides an illustrative example of display of the removal confirmation alert "Item(s) removed from cart," which may appear on a tinted base rectangle, together with an "undo" button enabling the removal to be reversed. In one embodiment, the removal alert displays for five seconds and then disappears.

Figure 14:
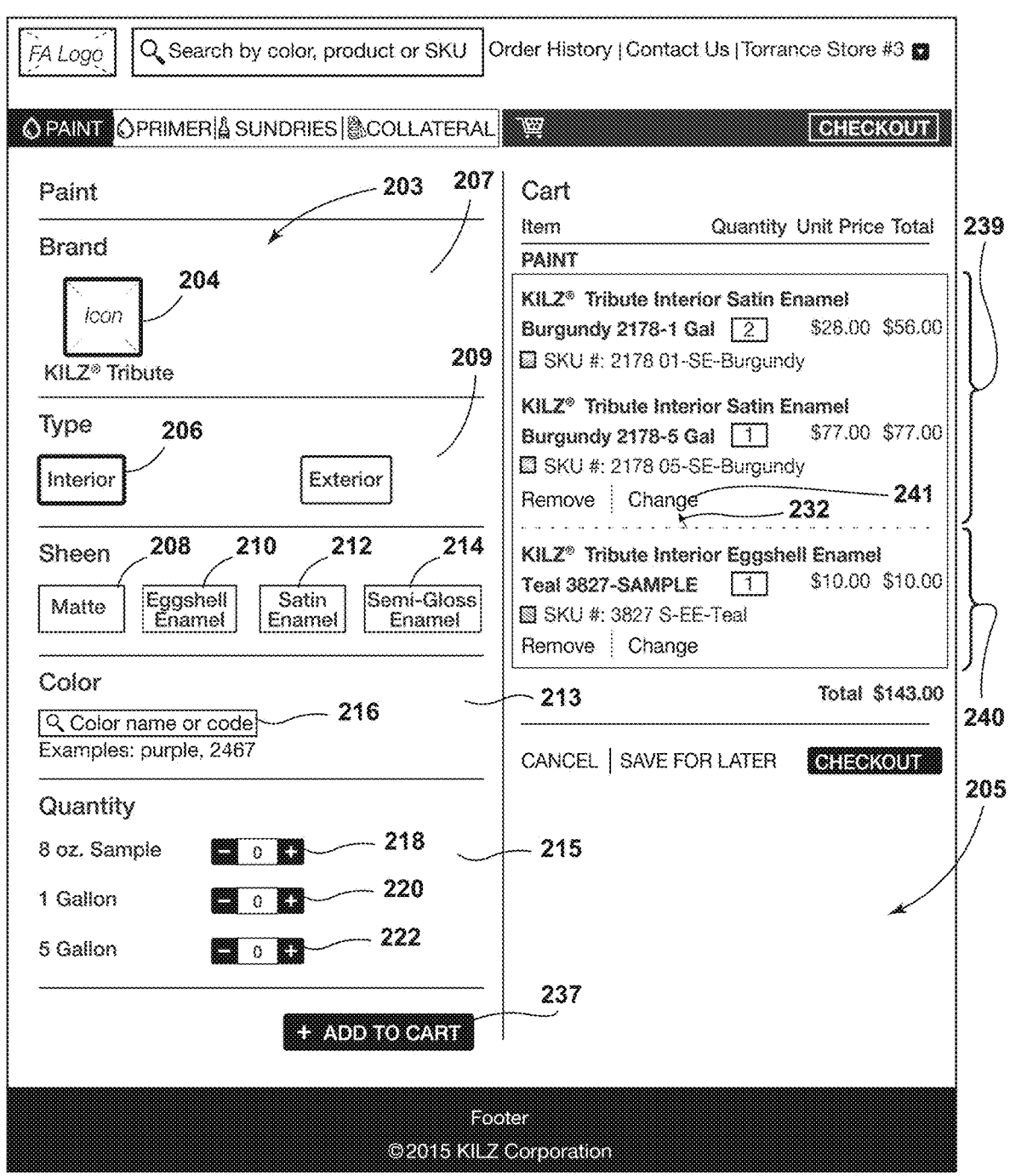
FIG. 14 illustrates use of a "Change link" using the web page of FIG. 6.
Figure 15:
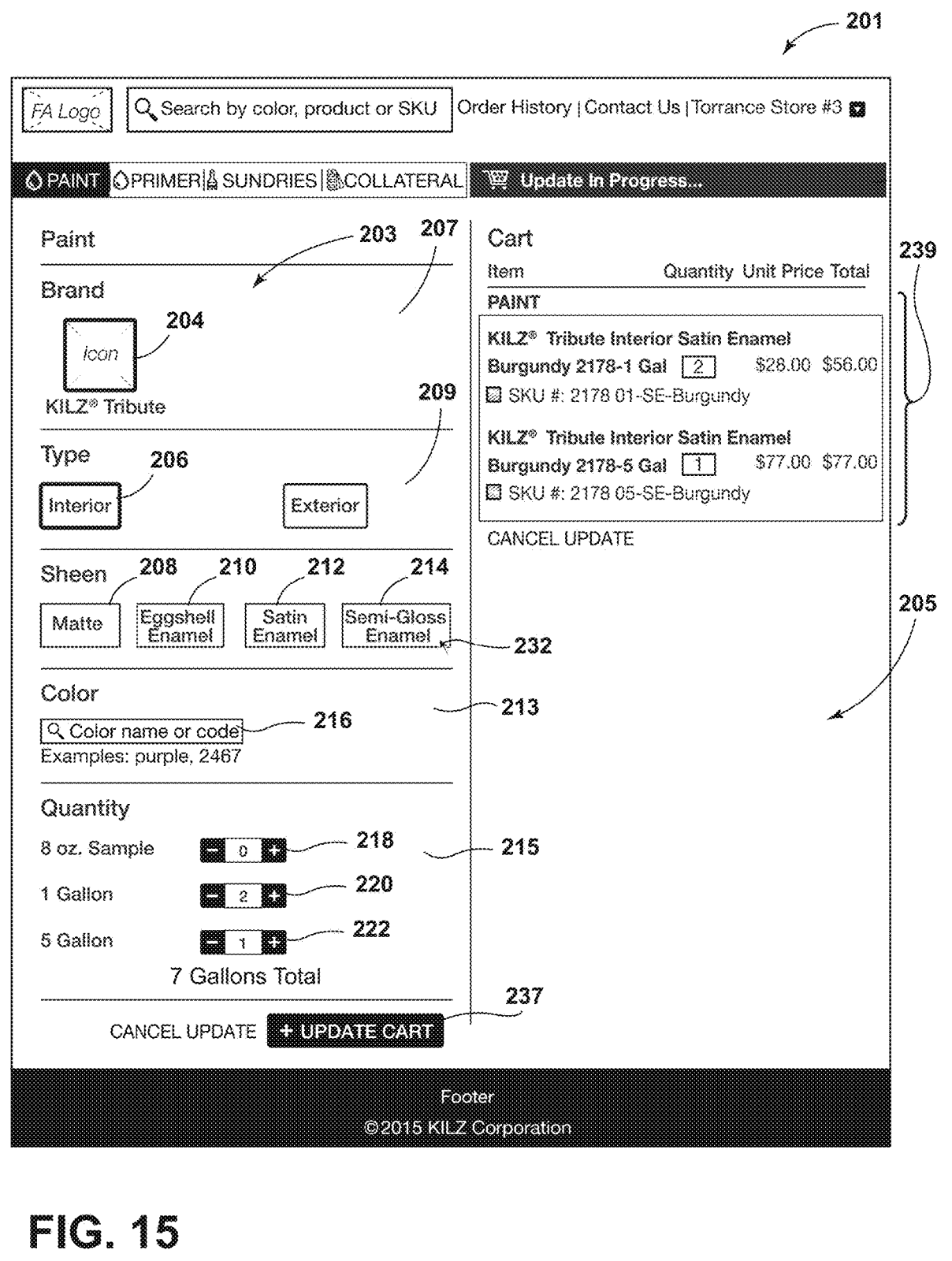

To update an item in the cart panel 205, a user may click a "Change" link or button 241 as illustrated in FIG. 14, which results in the display of FIG. 15. As seen in FIG. 15, only the item 239 selected for change appears in the cart panel 205. "Paint" navigation is now highlighted since a paint cart item is being changed. In FIG. 15, the cursor 232 is placed on the "Semi-gloss Enamel" selection button in the sheen section 211, indicating that a change is being made to the previously selected sheen. The label of the button 237 is changed to "update cart," and an "Update in progress" alert appears across the top of the cart panel 205. In one embodiment, the quantity text fields 218, 220, 222 may be disabled when a sheen change is being made.

Once the sheen is changed, the high lighting of the border of the "Satin Enamel" sheen rectangle 212 is terminated and the newly selected sheen rectangle 214 is highlighted. Additionally, the Paint product panel 203 refreshes back to its default state with the "Add To Cart" button 237 disabled, and the alerts adjacent to the button 237 and displayed across the top of the cart panel 205 are changed to read "Cart Updated." These alerts may be caused to disappear after a selected interval, e.g., two seconds. A tinted base fill in rectangle may be used to emphasize the changed item(s).

Figure 16:
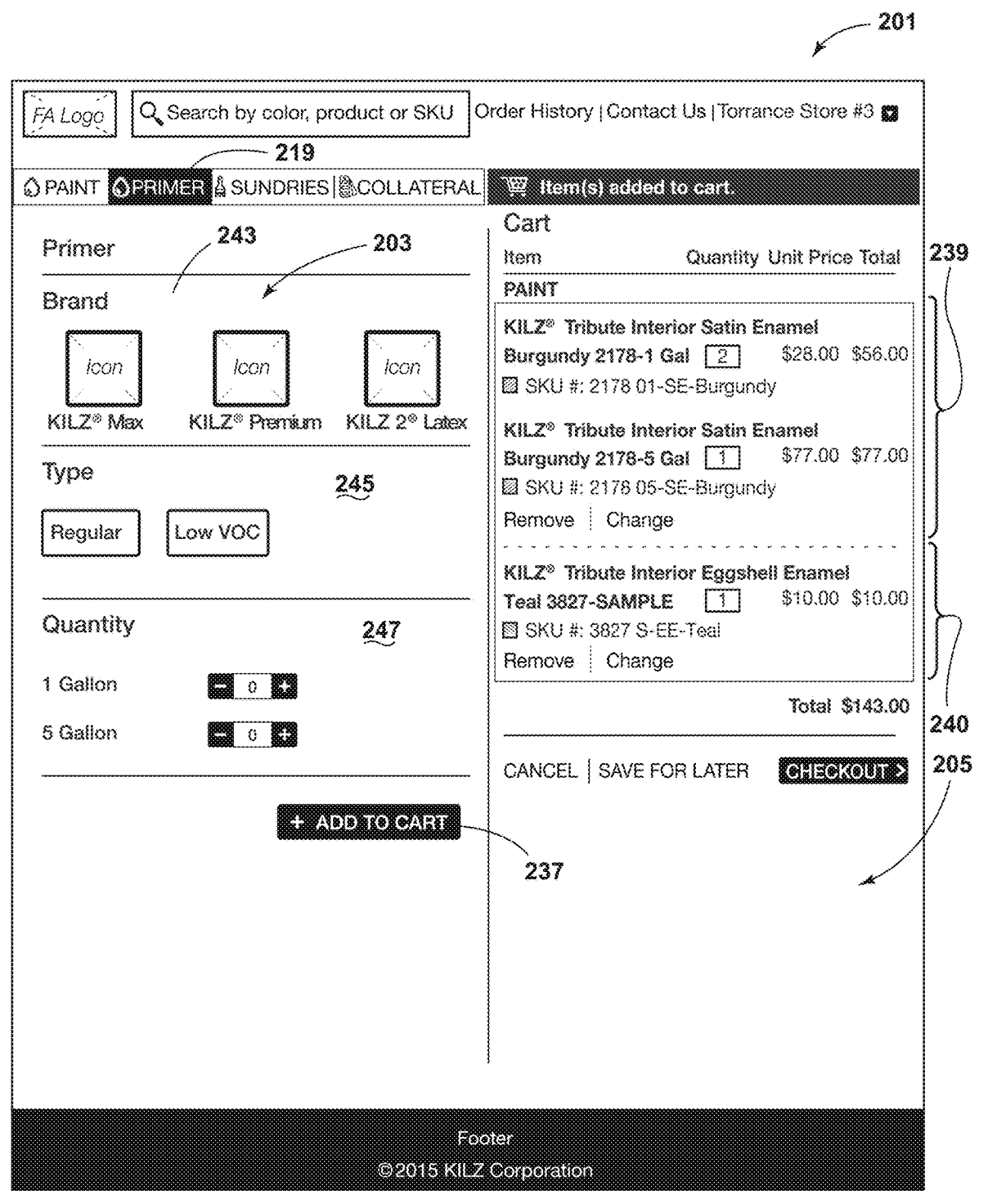
Figure 17:
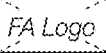
FIG. 17 illustrates the shopping cart panel of the web page of FIG. 6 after selection of a particular primer in connection with FIG. 16.

FIG. 16 illustrates the display presented when the "Primer" button 219 is selected in the product panel 203. As shown, selection of this button 219 causes display of three sections 243, 245, 247, enabling selection of the brand, type and quantity of primer. FIG. 17 shows the cart panel display 205 after selection of "Kilz Premium, Regular" and 4 one gallon cans in the three sections 243, 245, 247, using the same procedure and display functionality employed in connection with selection of paint in connection with FIGS. 6 to 9.

Figure 18:
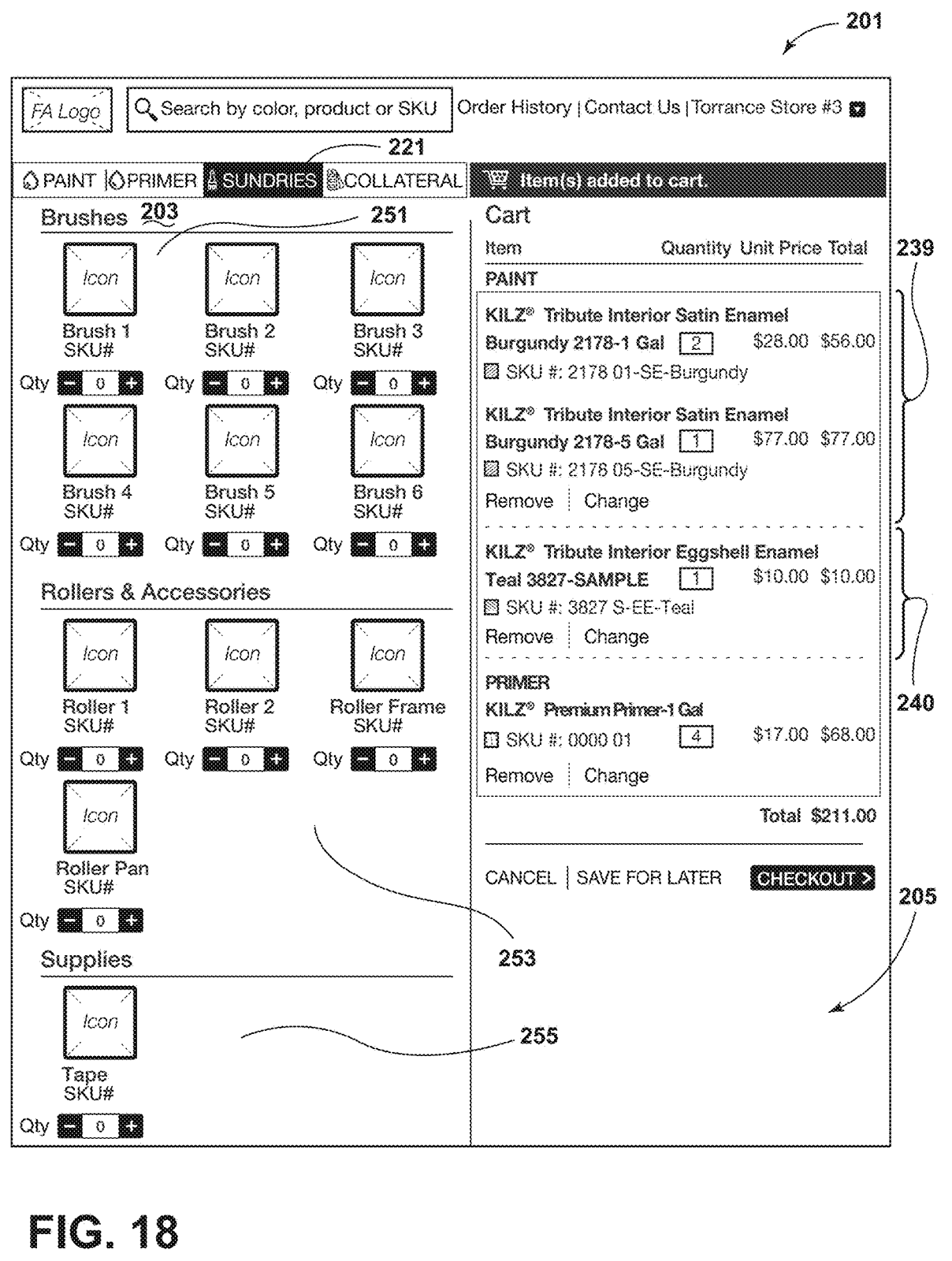
Figure 19:
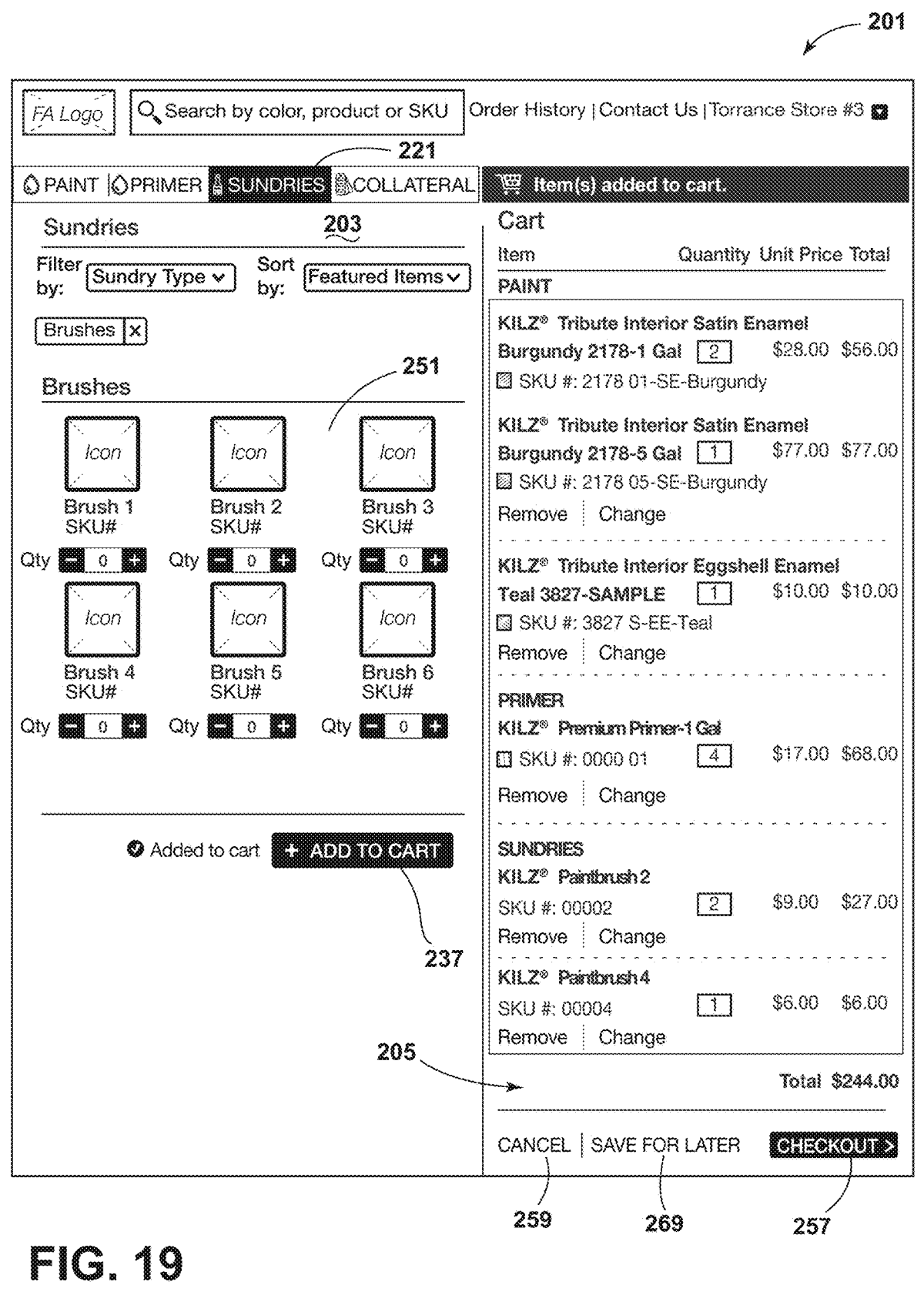

FIG. 18 shows an illustrative embodiment of a page displayed when "Sundries" button 221 is selected on the product panel 203. As shown, the cart panel 205 remains unchanged, while the product panel 203 displays three sections 251, 253, 255, respectively for brushes, rollers and accessories, and supplies. FIG. 19 illustrates the page 201 after selection of two types of brushes on the brush section 251. The brushes section 251 appears in the product panel but in a default state where user selections cannot be made. "Added To Cart" alerts appear adjacent the "Add To Cart" button 237 and across the top of the cart panel 205.

Figure 20:
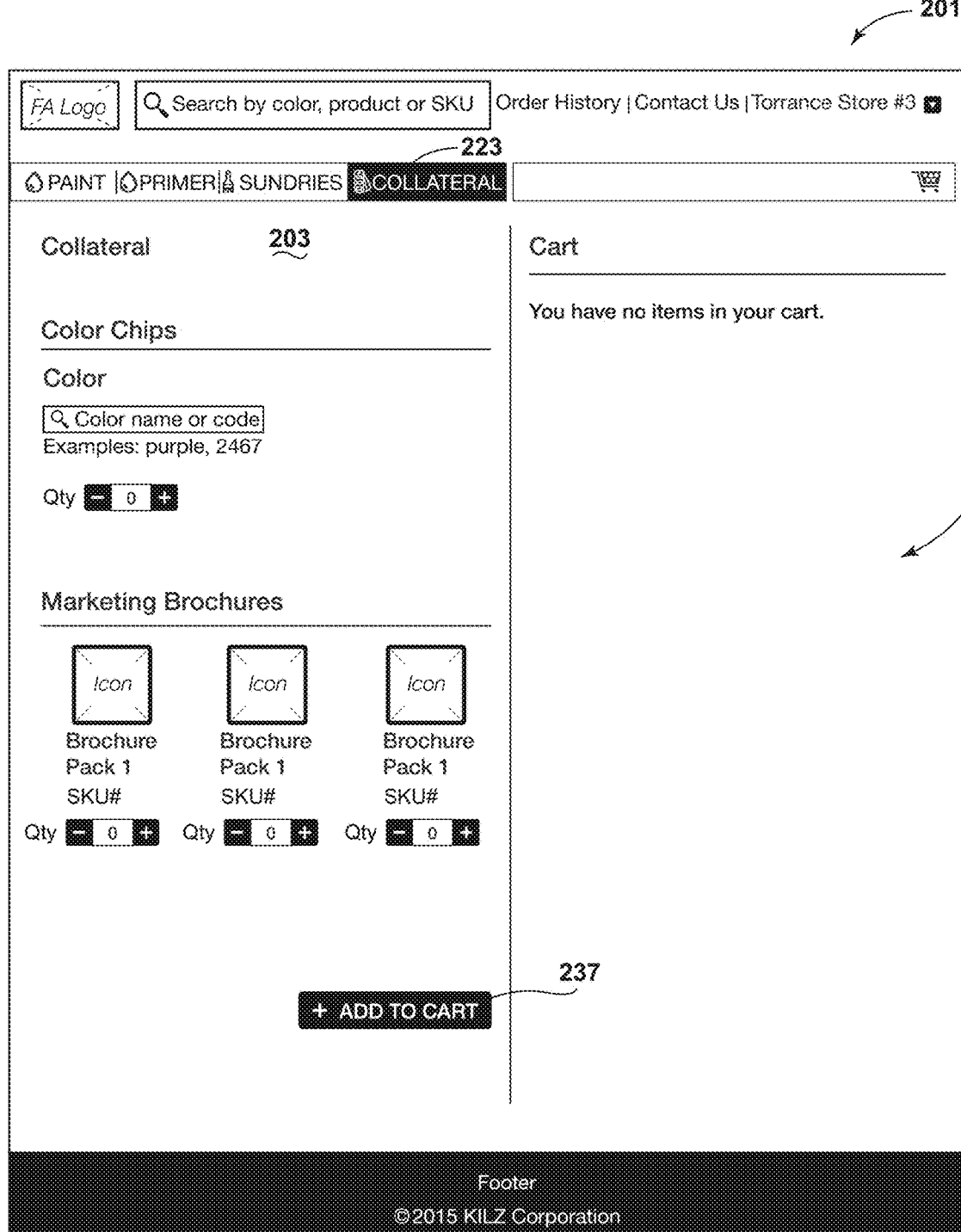
FIG. 20 illustrates the selection of collateral items using the web page of FIG. 6.

FIG. 20 shows an illustrative embodiment of a page displayed when the "Collateral" button 223 is selected on the product panel 203. In this case the selectable collateral items are color chips and marketing brochures, which may be added to the cart in the same manner as the paint, primer and sundry items discussed above.

Figure 22:
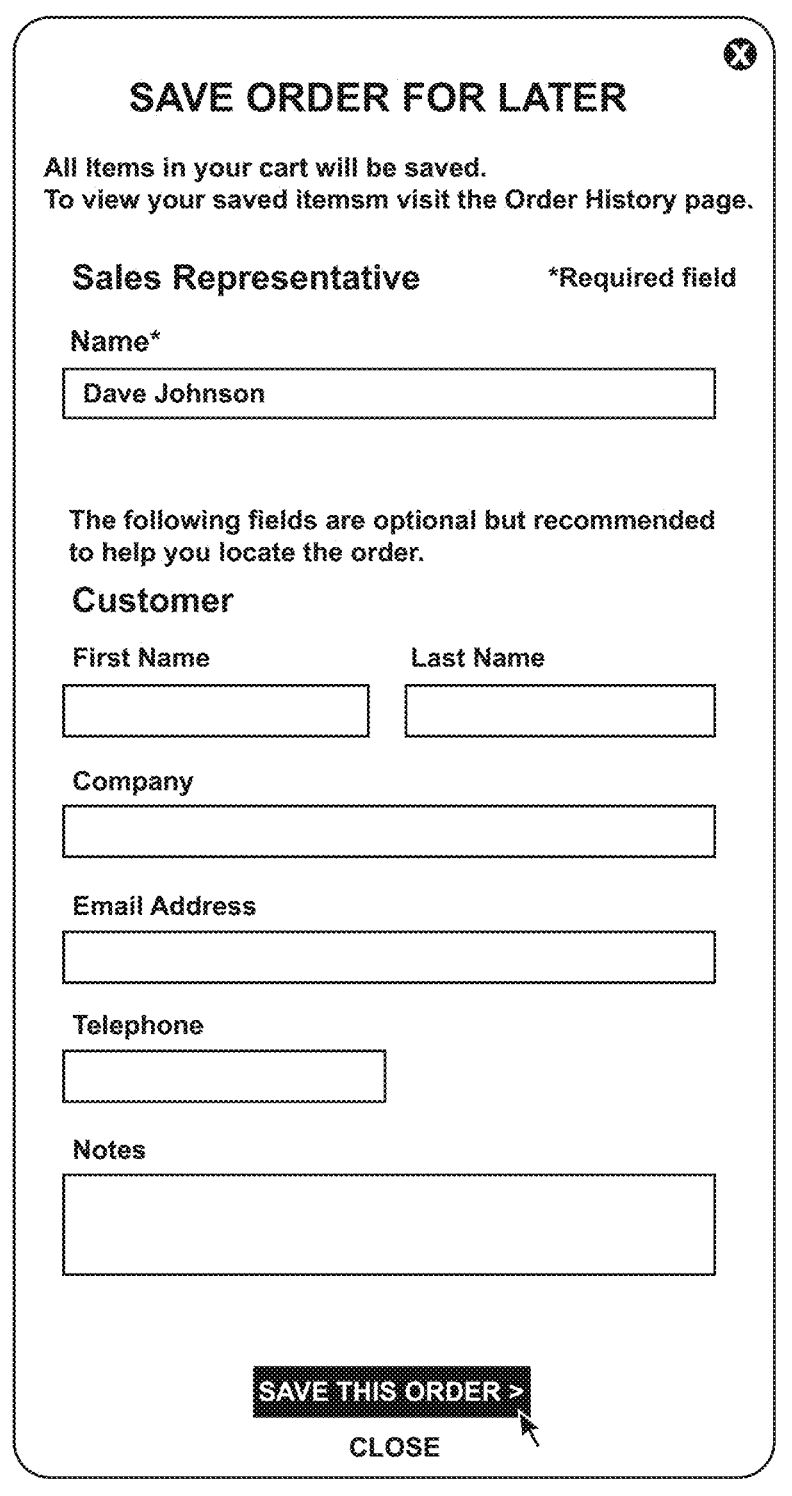

Once completed, an order may proceed to check out, may be canceled or may be saved for later by selection of one of the respective buttons or links 257, 259 or 269 shown in FIG. 19. If the "save for later" button 269 is selected, a screen such as that shown in FIG. 22 may be displayed allowing for entry and saving of the identity of the sales representative and customer contact information.

The illustrative web page or screen display 201 of FIG. 6 comprising a product selection panel 203 and cart panel 205 on the same page finds particular utility in adapting various retail environments to sell paint and paint products. In particular, for example, a retail dealer site of a company which traditionally sells flooring may be adapted to sell paint products by employing the sales tool display 201 and its functionality to generate orders and communicate those orders, for example, over the internet or other communication medium to a paint or coatings manufacturer who then formulates and mixes the paint or other coating product, packages it, and ships it out to the customer or retail site. In this manner, the flooring company avoids various drawbacks attendant to traditional retail paint stores, such as the necessity to maintain inventory, paint formulation equipment such as tinting and mixing equipment, display racks for items such as paint chips, brochures, etc., and employees having detailed knowledge of paint products and paint formulation procedures. The flooring or other company may employ its customary design or sales personnel to interact with the customer to select paint and paint related products using the interface provided by page 201 while providing only a modicum of additional training for such personnel. As mentioned above, while an present example of a flooring store is provided, the present teachings are applicable to any store that does not traditionally sell paint products, such as stores that sell products for construction, home improvement, home goods, interior decorating, and/or re-modeling projects, as well as other stores that sell home-related goods, such as furniture, home decorations, etc.

It will be appreciated that the illustrative embodiments provide aniColorConfigurator, also called instant Color Configurator or Color Builder, comprising a technique which allows customers to create an online configurable paint order from a single search string, with the interchangeable brand, size, base and color information needed to prepare/complete an online order without the information having to be entered by the user previously. More particularly, it allows a user using an internet portal or application to quickly purchase configurable items without having to go through an online product configuration process. Instead of manually inputting configurable attributes of an end product, a user can quickly search for an item with the predetermined attributes and drop it into a shopping cart with one-click or modify any of the attributes including quantity before sending the item(s) over to the shopping cart.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. A system comprising:
a server configured to:
receive a copy of paint product catalog information associated with a coating manufacturer from a computer system located at a coating manufacturer facility of the coating manufacturer;
store a paint product ordering application;
receive a measured color of a flooring product from a dealer computer terminal located at a flooring store remote from the coating manufacturer facility, the flooring product being sold at the flooring store, the dealer computer terminal being configured to receive the measured color of the flooring product from a spectrophotometer located at the flooring store;
determine a plurality of paint colors that coordinate with the flooring product based on the measured color of the flooring product and the copy of the paint product catalog information;
communicate the plurality of paint colors to the dealer computer terminal;
run the paint product ordering application, the paint product ordering application being configured to interact with a web browser of the dealer computer terminal to provide at least one paint product ordering web page to the dealer computer terminal and to cause the at least one paint product ordering web page to be updated in response to operations of a user of the dealer computer terminal on the at least one paint product ordering web page to enable the user of the dealer computer terminal to create an order for a paint product based on a selected paint color from the plurality of paint colors;
receive the order for the paint product from the dealer computer terminal; and
communicate the order for the paint product to the computer system located at the coating manufacturer facility of the coating manufacturer, the computer system being configured to receive transmission of the order for the paint product from the server for order fulfillment at the coating manufacturer facility, the order fulfillment including creating, packing, and shipping the paint product to the user.

2. The system of claim 1, wherein:
the at least one paint product ordering web page comprises an interactive screen display comprising a paint product selection panel and a shopping cart panel; and
the interactive screen display is configured to:
enable the user to perform a first plurality of selection operations on the paint product selection panel to select a first paint order comprising a first paint color, a first sheen for that first paint color, and a first quantity of paint having the first paint color;
enable the user to cause the first paint order to appear in the shopping cart panel and to cause the paint product selection panel to refresh back to a default state wherein a second paint order can be created on the paint product selection panel;
enable the user to perform a second plurality of selection operations on the paint product selection panel to select a second paint order comprising a second paint color, a second sheen for that second paint color, and a second quantity of paint having the second paint color; and
enable the user to cause the second paint order to appear in the shopping cart panel.

3. The system of claim 2, wherein the paint product selection panel is configured to allow selection of at least one of a primer product, a paint brush product, a paint roller product, color chips, and a marketing brochure.

4. The system of claim 2, wherein the interactive screen display is further configured to enable the user to remove a selected item from at least one of the first paint order and the second paint order.

5. The system of claim 2, wherein the interactive screen display is further configured to enable the user to change a characteristic of a selected item from at least one of the first paint order and the second paint order.

6. A method comprising:
receiving, with a server, a copy of paint product catalog information associated with a coating manufacturer from a computer system located at a coating manufacturer facility of the coating manufacturer;
storing, with the server, a paint product ordering application;
receiving, with the server, a measured color of a flooring product from a dealer computer terminal located at a flooring store remote from the coating manufacturer facility, the flooring product being sold at the flooring store, the dealer computer terminal being configured to receive the measured color of the flooring product from a spectrophotometer located at the flooring store;
determining, with the server, a plurality of paint colors that coordinate with the flooring product based on the measured color of the flooring product and the copy of the paint product catalog information;
communicating, with the server, the plurality of paint colors to the dealer computer terminal;
running, with the server, the paint product ordering application, the paint product ordering application being configured to interact with a web browser of the dealer computer terminal to provide at least one paint product ordering web page to the dealer computer terminal and to cause the at least one paint product ordering web page to be updated in response to operations of a user of the dealer computer terminal on the at least one paint product ordering web page to enable the user of the dealer computer terminal to create an order for a paint product based on a selected paint color from the plurality of paint colors;
receiving, with the server, the order for the paint product from the dealer computer terminal; and
communicating, with the server, the order for the paint product to the computer system located at the coating manufacturer facility of the coating manufacturer, the computer system being configured to receive transmission of the order for the paint product from the server for order fulfillment at the coating manufacturer facility, the order fulfillment including creating, packing, and shipping the paint product to the user.

7. The method of claim 6, wherein:
the at least one paint product ordering web page comprises an interactive screen display comprising a paint product selection panel and a shopping cart panel; and
the interactive screen display is configured to:
enable the user to perform a first plurality of selection operations on the paint product selection panel to select a first paint order comprising a first paint color, a first sheen for that first paint color, and a first quantity of paint having the first paint color;
enable the user to cause the first paint order to appear in the shopping cart panel and to cause the paint product selection panel to refresh back to a default state wherein a second paint order can be created on the paint product selection panel;

enable the user to perform a second plurality of selection operations on the paint product selection panel to select a second paint order comprising a second paint color, a second sheen for that second paint color, and a second quantity of paint having the second paint color; and enable the user to cause the second paint order to appear in the shopping cart panel.

8. The method of claim 7, wherein the paint product selection panel is configured to allow selection of at least one of a primer product, a paint brush product, a paint roller product, color chips, and a marketing brochure.

9. The method of claim 7, wherein the interactive screen display is further configured to enable the user to remove a selected item from at least one of the first paint order and the second paint order.

10. The method of claim 7, wherein the interactive screen display is further configured to enable the user to change a characteristic of a selected item from at least one of the first paint order and the second paint order.

11. A non-transitory computer readable medium storing computer readable program code that, when executed by at least one computer, configure the at least one computer to:

receive a copy of paint product catalog information associated with a coating manufacturer from a computer system located at a coating manufacturer facility of the coating manufacturer;

store a paint product ordering application;

receive a measured color of a flooring product from a dealer computer terminal located at a flooring store remote from the coating manufacturer facility, the flooring product being sold at the flooring store, the dealer computer terminal being configured to receive the measured color of the flooring product from a spectrophotometer located at the flooring store;

determine a plurality of paint colors that coordinate with the flooring product based on the measured color of the flooring product and the copy of the paint product catalog information;

communicate the plurality of paint colors to the dealer computer terminal;

run the paint product ordering application, the paint product ordering application being configured to interact with a web browser of the dealer computer terminal to provide at least one paint product ordering web page to the dealer computer terminal and to cause the at least one paint product ordering web page to be updated in response to operations of a user of the dealer computer terminal on the at least one paint product ordering web page to enable the user of the dealer computer terminal to create an order for a paint product based on a selected paint color from the plurality of paint colors;

receive the order for the paint product from the dealer computer terminal; and communicate the order for the paint product to the computer system located at the coating manufacturer facility of the coating manufacturer, the computer system being configured to receive transmission of the order for the paint product from the at least one computer for order fulfillment at the coating manufacturer facility, the order fulfillment including creating, packing, and shipping the paint product to the user.

12. The non-transitory computer readable medium of claim 11, wherein:

the at least one paint product ordering web page comprises an interactive screen display comprising a paint product selection panel and a shopping cart panel; and the interactive screen display is configured to:

enable the user to perform a first plurality of selection operations on the paint product selection panel to select a first paint order comprising a first paint color, a first sheen for that first paint color, and a first quantity of paint having the first paint color;

enable the user to cause the first paint order to appear in the shopping cart panel and to cause the paint product selection panel to refresh back to a default state wherein a second paint order can be created on the paint product selection panel;

enable the user to perform a second plurality of selection operations on the paint product selection panel to select a second paint order comprising a second paint color, a second sheen for that second paint color, and a second quantity of paint having the second paint color; and enable the user to cause the second paint order to appear in the shopping cart panel.

13. The non-transitory computer readable medium of claim 12, wherein the paint product selection panel is configured to allow selection of at least one of a primer product, a paint brush product, a paint roller product, color chips, and a marketing brochure.

14. The non-transitory computer readable medium of claim 12, wherein the interactive screen display is further configured to enable the user to remove a selected item from at least one of the first paint order and the second paint order.

15. The non-transitory computer readable medium of claim 12, wherein the interactive screen display is further configured to enable the user to change a characteristic of a selected item from at least one of the first paint order and the second paint order.

* * * * *